United States Patent [19]
Tabata et al.

[11] Patent Number: 6,067,492
[45] Date of Patent: *May 23, 2000

[54] DISPLAY SYSTEM FOR AUTOMATIC TRANSMISSIONS

[75] Inventors: Atsushi Tabata, Okazaki; Hideo Tomomatsu, Nagoya; Haruyuki Kodera, Toyota; Kenji Niwa, Kasugai, all of Japan

[73] Assignee: Toyota Jidosha Kabushiki Kaisha, Toyota, Japan

[ * ] Notice: This patent is subject to a terminal disclaimer.

[21] Appl. No.: 08/937,733

[22] Filed: Sep. 25, 1997

[30] Foreign Application Priority Data

Sep. 27, 1996 [JP] Japan ................................. 8-277351

[51] Int. Cl.⁷ ......................................................... G06F 7/76
[52] U.S. Cl. ................................ 701/51; 701/63; 701/64; 701/62; 74/335; 74/336 R; 477/906; 477/907
[58] Field of Search .................................. 701/51, 53, 55, 701/56, 64, 62, 63; 477/79, 64, 122, 125, 906, 907; 74/335, 336 R, 475, 473.18, 473.1; 192/4 A

[56] References Cited

U.S. PATENT DOCUMENTS 4,821,593  4/1989  Kobylarz ..................................... 74/475
5,156,243  10/1992  Aoki et al. ................................ 192/4 A
5,224,393  7/1993  Ashikawa et al. ....................... 74/337.5
5,351,570  10/1994  Mizunuma et al. ........................ 74/335
5,658,219  8/1997  Kondo et al. ............................ 477/122
5,669,848  9/1997  Kondo et al. .............................. 477/64
5,861,803  1/1999  Issa et al. ................................. 340/456
5,865,705  2/1999  Shamoto et al. ........................... 477/79
5,916,292  6/1999  Issa et al. .................................. 701/62

FOREIGN PATENT DOCUMENTS 5-196118  8/1993  Japan .

*Primary Examiner*—Jacques H. Louis-Jacques
*Attorney, Agent, or Firm*—Oblon, Spivak, McClelland, Maier & Neustadt, P.C.

[57] ABSTRACT

A display system for an automatic transmission including: a first range switching mechanism for switching a shift range by a mechanical operation; and a second range switching mechanism activated by electric enabling mechanism for switching the shift range by an electric operation. The display system comprises: a first display device for displaying the shift range which is selected by the first range switching mechanism; a second display device for displaying the active state of the enabling mechanism; and a third display device for displaying the shift range which is selected by the second range switching mechanism activated by the enabling mechanism.

25 Claims, 17 Drawing Sheets

ESR 3-RANGE

FIG.6
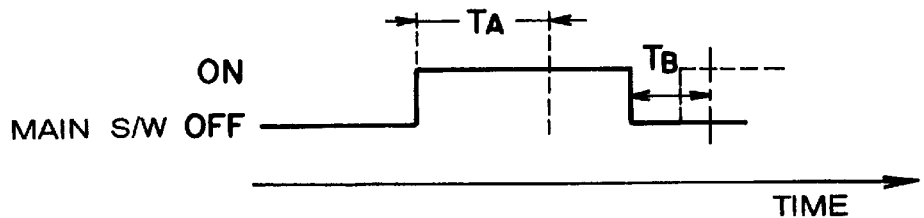
FIG.7
| INITIAL STATE | ACTIVE | | INACTIVE | |
|---|---|---|---|---|
| MAIN FAIL MODE | ON FAIL | OFF FAIL | ON FAIL | OFF FAIL |
| SWITCHING OF MAIN S/W | NO | NO | NO | NO |
| SITUATIONS | CONTINUED ACTIVE | | CONTINUED INACTIVE | |
| INDICATION | MAIN | | — | |
FIG.8
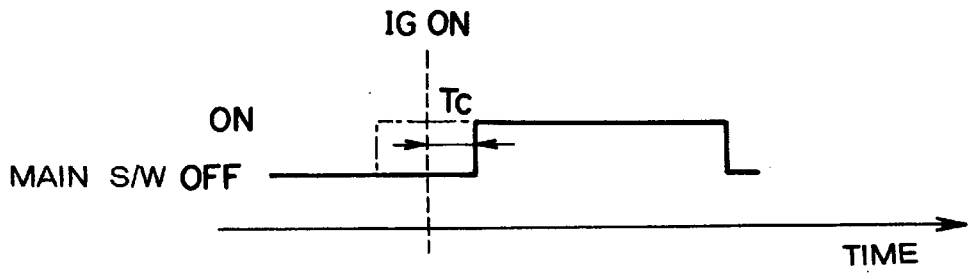

FIG.18

|   |   | C-0 | C-1 | C-2 | B-0 | B-1 | B-2 | B-3 | B-4 | F-0 | F-1 | F-2 |
|---|---|---|---|---|---|---|---|---|---|---|---|---|
|   | P |  |  |  |  |  |  |  |  |  |  |  |
|   | Rev |  |  | ○ | ○ |  |  |  | ○ |  |  |  |
|   | N | ○ |  |  |  |  |  |  |  |  |  |  |
| D | 1st | ○ | ○ |  |  |  |  |  |  | ○ |  | ○ |
| D | 2nd |  | ○ |  |  |  |  | ○ |  | ○ |  |  |
| D | 3rd | ○ | ○ |  |  |  | ○ |  |  | ○ | ○ |  |
| D | 4th | ○ | ○ | ○ |  |  | ◎ |  |  | ○ |  |  |
| D | 5th |  | ○ | ○ | ○ |  | ◎ |  |  |  |  |  |
| 4 | 1st | ○ | ○ |  |  |  |  |  |  | ○ |  | ○ |
| 4 | 2nd |  | ○ |  |  |  |  | ○ |  | ○ |  |  |
| 4 | 3rd | ○ | ○ |  |  |  | ○ |  |  | ○ | ○ |  |
| 4 | 4th | ○ | ○ | ○ |  |  | ◎ |  |  | ○ |  |  |
| 3 | 1st | ○ | ○ |  |  |  |  |  |  | ○ |  | ○ |
| 3 | 2nd |  | ○ |  |  |  |  | ○ |  | ○ |  |  |
| 3 | 3rd | ○ | ○ |  |  | ● | ○ |  |  | ○ | ○ |  |
| 2 | 1st | ○ | ○ |  |  |  |  |  |  | ○ |  | ○ |
| 2 | 2nd | ● | ○ |  |  |  |  | ○ |  | ○ |  |  |
| L | 1st | ○ | ○ |  |  |  |  |  | ● | ○ |  | ○ |

DISPLAY SYSTEM FOR AUTOMATIC TRANSMISSIONS

BACKGROUND OF THE INVENTION

1. Field of the Invention

The present invention relates to a display system for displaying the acting state of an automatic transmission for a vehicle.

2. Related Art

The automatic transmission for a vehicle is given a fundamental function to set a gear stage automatically on the basis of a running condition such as a vehicle speed or a throttle opening. On the other hand, the selection of the shift range, in which the engine braking is effected at a predetermined medium or lower gear stage or in which the gear stage to be set is limited to a predetermined medium or lower one, is manually made by the driver. In the prior art, the selection of that shift range is made by operating a shift lever which is located on the floor or steering column and so on. For this operation, the driver has to leave one hand from the steering wheel or has to turn the eyes temporarily from the front road. This raises operational problems to be improved.

In the invention disclosed in Japanese Patent Laid-Open No. 196118/1993 (JPA-5-196118), therefore, the steering handle is equipped with a switch, which is suitably turned ON/OFF to switch the shift range.

When the shift range is to be electrically switched by a switching operation, as described in the above publication, it is a current practice to provide up and down switches while considering the operability. On the other hand, there are a plurality of shift ranges to be selected by the switching operation. Thus, the switch to be used for selecting the shift ranges is constructed to output its signal, each time it is operated, but to fail to determine a specific acting state. Specifically, some switch is given a structure disabling the driver to know the actually set shift range.

In the shift range at a medium or lower speed, on the other hand, the engine braking is effected at a predetermined gear stage. If a shift range being set at a higher speed is switched to a shift range at a medium or lower speed while the vehicle is running, the engine braking state is caused simultaneously with the downshift. If the vehicle is then running at a high speed, the engine RPM grows excessively high, and the switching of the shift range is inhibited depending upon the vehicle speed.

When the shift range is thus electrically switched, the switch therefor may fail to display the actually set shift range, and the shift range may not be switched even by the switching operation. As different from the switching of the shift range by the lever operation, therefore, there is a disadvantage that the shift range cannot be known from the switching mechanism such as the switch.

SUMMARY OF THE INVENTION

A main object of the present invention is to provide an automatic transmission having a mechanism capable of switching a shift range electrically, with a display system capable of displaying the acting state of the mechanism.

Another object of the present invention is to provide a system capable of informing the driver reliably and timely of the unchangeable state in which the shift range cannot be switched by the mechanism for switching the shift range electrically.

Still another object of the present invention is to provide a system capable of informing the driver of an alternative operation when the shift range cannot be switched by the electric operation.

According to the present invention, there is provided a display system for an automatic transmission including: a first range switching mechanism for switching a shift range by mechanical means; and a second range switching mechanism activated by electric enabling means for switching the shift range by electric means. The display system comprises: first display means for displaying the shift range which is selected by the first range switching mechanism; second display means for displaying the acting state of the enabling means; and third display means for displaying the shift range which is selected by the second range switching mechanism activated by the enabling means.

As a result, each shift range, as set by the first range switching mechanism or the second range switching mechanism, is displayed by the first display means or the third display means so that the shift range set in the automatic transmission can be known without fail. In the second display means, moreover, it is displayed that the second range switching mechanism for switching the shift range electrically is active. On the basis of the display, therefore, the switching of the shift range by the second range switching mechanism can be executed.

According to the present invention, there is provided a display system for an automatic transmission capable of switching a shift range by electric means, which system comprises: fail display means for displaying that the switching of the shift range by the electric means is disabled by a fail; and switching interrupt display means for displaying that the switching of the shift range by the electric means is temporarily unable on the basis of a running state.

Therefore, the means for switching the shift range electrically can reliably discriminate the state disabled by the fail and the temporarily disabled state caused by the running state. As a result, it is easily decided on the basis of the displays of the individual display means that the shift range should be switched by mechanical means such as the shift lever in place of the electric means, or that the shift range should be switched by the electric means while awaiting the change in the running state.

According to the present invention, there is provided a display system for an automatic transmission including: a first range switching mechanism for switching a shift range by mechanical means; and a second range switching mechanism for switching the shift range by electric means, which system comprises: electric switching inhibition detecting means for detecting that the switching to an engine braking range by the second range switching mechanism is unable; and manual switching display means for making a display to urge the switching to the engine braking range by the first range switching mechanism, when it is detected by the electric switching inhibition detecting means that the switching to the engine braking range by the second range switching mechanism is unable.

As a result, when the second range switching mechanism for switching the shift range electrically does not function, the switching to the engine braking range is urged by the first range switching mechanism on the basis of the display of the manual switching display means. As a result, it is possible to prevent in advance the delay, as might otherwise be caused by continuing to operate the second range switching mechanism disabled, in the switching of the shift range and the according increase in the frequency of using the brake.

According to the present invention, moreover, there is provided a display system for an automatic transmission including: a first range switching mechanism for switching a shift range by mechanical means; and a second range switching mechanism for switching the shift range by electric means, which system comprises: electric shift detecting means for detecting that an engine braking range is selected by the second range switching mechanism; deceleration detecting means for detecting a deceleration when the switching to the engine braking range is detected by the electric shift detecting means; electric switching inhibited state detecting means for detecting a fail of the switching to the engine braking range by the second range switching mechanism on the basis of the deceleration which is detected by the deceleration detecting means.

As a result, when the shift range is shifted to the engine braking range by the second range switching mechanism, the fail, as might otherwise be caused because the deceleration to occur intrinsically is not established, in the second range switching mechanism itself or in the related hydraulic unit can be detected as one of the entire system relating to the second range switching mechanism.

According to the present invention, there is provided a display system for an automatic transmission capable of switching a shift range by electric means, which system comprises: emphasized display means for emphasizing the display of the shift range which is set at the instant when the switching to the engine braking range by the electric means is rejected.

From the emphasized display of the prevailing shift range, therefore, it is possible to know that the switching of the shift range by the electric means cannot be temporarily made. As a result, the shift range, as set in the automatic transmission, can be known while making preparations for the subsequent operation.

According to the present invention, there is provided a display system for an automatic transmission capable of switching a shift range by electric means, which system comprises: a head-up display for displaying on a windshield of a vehicle at least one of the shift range set by the electric means and a gear stage set by the shift range.

As a result, the means for switching the shift range electrically can be mounted on a place where it can be operated simultaneously with the steering operation of the steering wheel. In addition, the shift range or gear stage, as set by the electric means, appears in the sight at the front of the vehicle thereby to improve the visibility of the switching of the shift range, and the shift range or gear stage set by the switching operation.

According to the present invention, moreover, there is provided a display system for an automatic transmission including a range switching mechanism activated by electric enabling means for switching a shift range by electric means, which system comprises: a momentary switch for outputting, when turned ON, a signal for activating the range switching mechanism; control means for processing to enable/disable the range switching mechanism on the basis of the signal; and display means for displaying the processed result by the control means.

As a result, when the momentary switch is operated as the enabling means, whether or not its operation is effectively accepted by the control means can be confirmed by the display means thereby to improve the operability.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 6 is an explanatory diagram for explaining the time period for an electronic control unit to recognize the ON state of a main switch;

FIG. 7 is a diagram tabulating a1 the active/inactive states to be set as the fail of the main switch;

FIG. 8 is an explanatory diagram for explaining the timing with the ON state of an ignition switch for the electronic control unit to recognize the ON state of the main switch;

FIG. 18 is a chart tabulating the applied/released states of frictional engagement elements for setting individual gear stages;

DETAILED DESCRIPTION OF THE PREFERRED EMBODIMENTS

Figure 16:
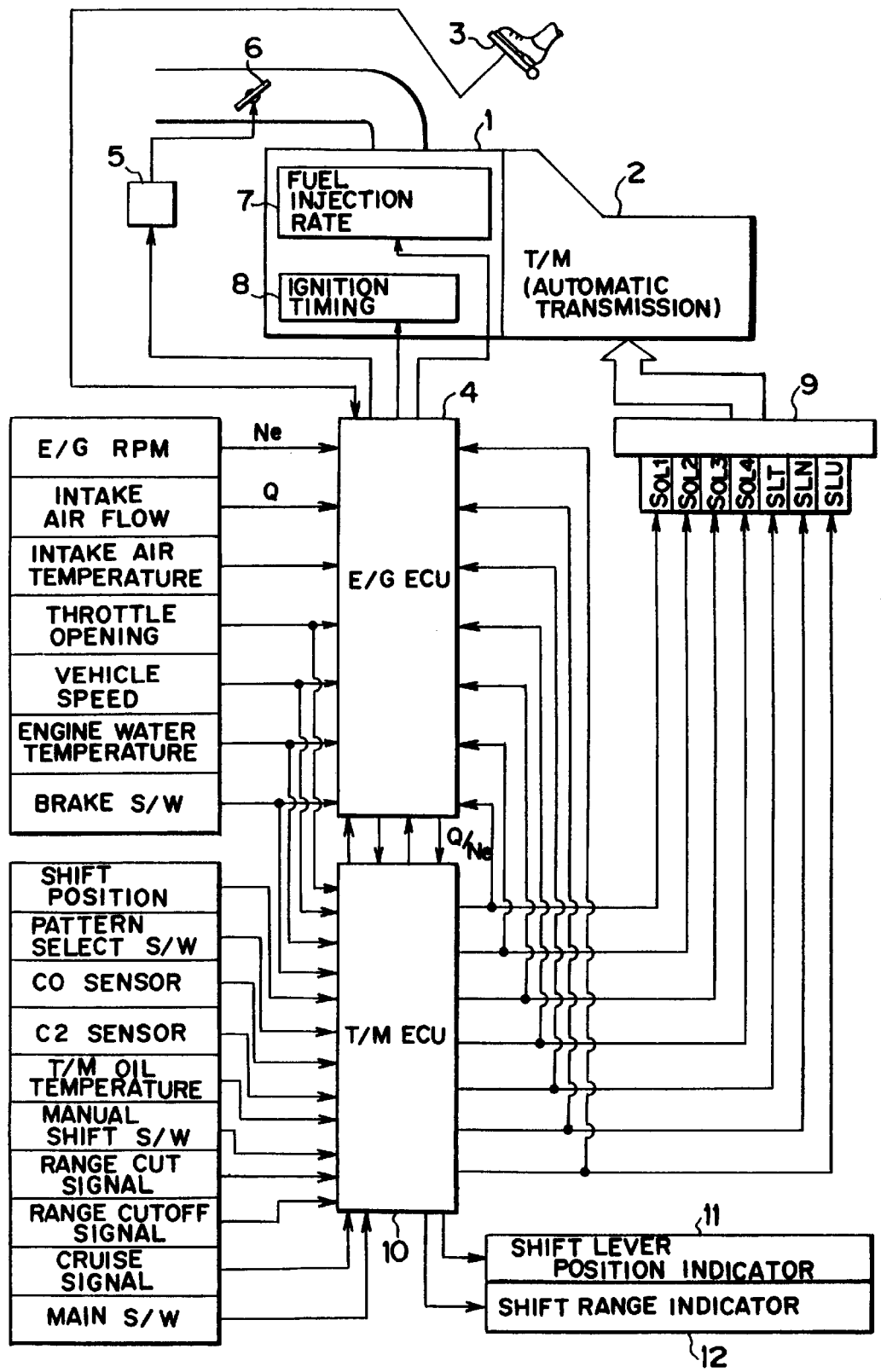
FIG. 16 is a diagram schematically showing an overall control system of an automatic transmission to which is applied the present invention.

The present invention will be described in more detail with reference to the accompanying drawings. Here will be described an overall control system. FIG. 16 shows the control system of an engine (E/G) 1 as an example of the prime mover and an automatic transmission 2. A signal according to the depression of an accelerator pedal 3 is inputted to an E/G ECU (i.e., an electronic control unit for the engine) 4. The intake pipe of the engine 1 is equipped with an electronic throttle valve 6 to be driven by a throttle actuator 5. The electronic throttle valve 6 is controlled in its degree of opening by a control signal which is outputted according to the depression of the accelerator pedal 3 from the E/G ECU 4 to the throttle actuator 5.

The E/G ECU 4 for controlling the engine 1 is mainly constructed of a central processing unit (CPU), memories (RAM and ROM) and an input/output interface. In addition to the aforementioned signal according to the depression of the accelerator pedal 3, control data including an engine RPM Ne, an intake air flow Q, an intake air temperature, a throttle opening, a vehicle speed, an engine water temperature and a brake switch output signal are inputted to that E/G ECU 4. On the other hand, this E/G ECU 4 is constructed to control the throttle actuator 5 and to output signals to a fuel injector 7 for the torque control at a shifting time and an igniter 8 for changing the ignition timing.

The automatic transmission 2, as connected to the engine 1, is the so-called "electronic control automatic transmission" for controlling the oil pressure electrically to control the shifts and the application/release of a lock-up clutch. The oil pressure is controlled by a hydraulic control unit 9. This hydraulic control unit 9 is equipped with: three shift solenoid valves SOL1, SOL2 and SOL3 for executing the shifts mainly; a solenoid valve SOL4 for controlling the engine braking state mainly; a linear solenoid valve SLU for controlling the lock-up clutch mainly; a linear solenoid valve SLT for controlling a line pressure in accordance with the throttle opening mainly; and a linear solenoid valve SLN for controlling the back pressure of an accumulator mainly.

There is further provided a T/M ECU (i.e., an electronic control unit for the automatic transmission) 10 for outputting control signals to the individual solenoid valves of that hydraulic control unit 9. This TM ECU 10 is mainly constructed, like the aforementioned E/G ECU 4, of a central processing unit (CPU), memories (RAM and ROM) and an input/output interface so that it can be united/integrated, if necessary, with the E/G ECU 4. The T/M ECU 10 is constructed to execute arithmetic operations, as based upon input data, in accordance with maps and arithmetic expressions stored in advance, and to output control signals, as based upon the arithmetic results, to the aforementioned individual solenoid valves to control the application/release of the lock-up clutch and the transient oil pressure at the shifting time.

To the T/M ECU 10, moreover, there are inputted control data including not only the aforementioned throttle opening, vehicle speed, engine water temperature and brake switch output signal but also a shift position indicating the position of a shift lever acting as a first range switching mechanism, a pattern select switch output signal, an output signal of a C0 sensor for detecting the RPM of a clutch C0, an output signal of a C2 sensor for detecting the RPM of a second clutch C2, the oil temperature of the automatic transmission 2, an output signal of a manual shift switch, a cut signal for switching a shift range to a lower-speed one, a cut-off signal for switching a shift range to a higher-speed one, and a cruise signal to be outputted from a (not-shown) cruise controller for keeping the vehicle speed at a constant value. With the T/M ECU 10, moreover, there are connected a shift lever position indicator 11 for indicating the position of the shift lever, and a shift range indicator 12 for indicating the shift range selected. These indicators 11 and 12 will be described hereinafter. There can also be provided a main switch to be turned ON/OFF for outputting the aforementioned cut signal and cut-off signal effectively. Then, the signal of the main switch is inputted to the T/M ECU 10.

These electronic control units 4 and 10 are connected to transmit the data to each other such that the signals for setting the individual gear stages are transmitted from the T/M ECU 10 to the E/G ECU 4 whereas the intake air flow (Q/Ne) per revolution of the engine 1 is transmitted from the E/G ECU 4 to the T/M ECU 10.

Figure 17:
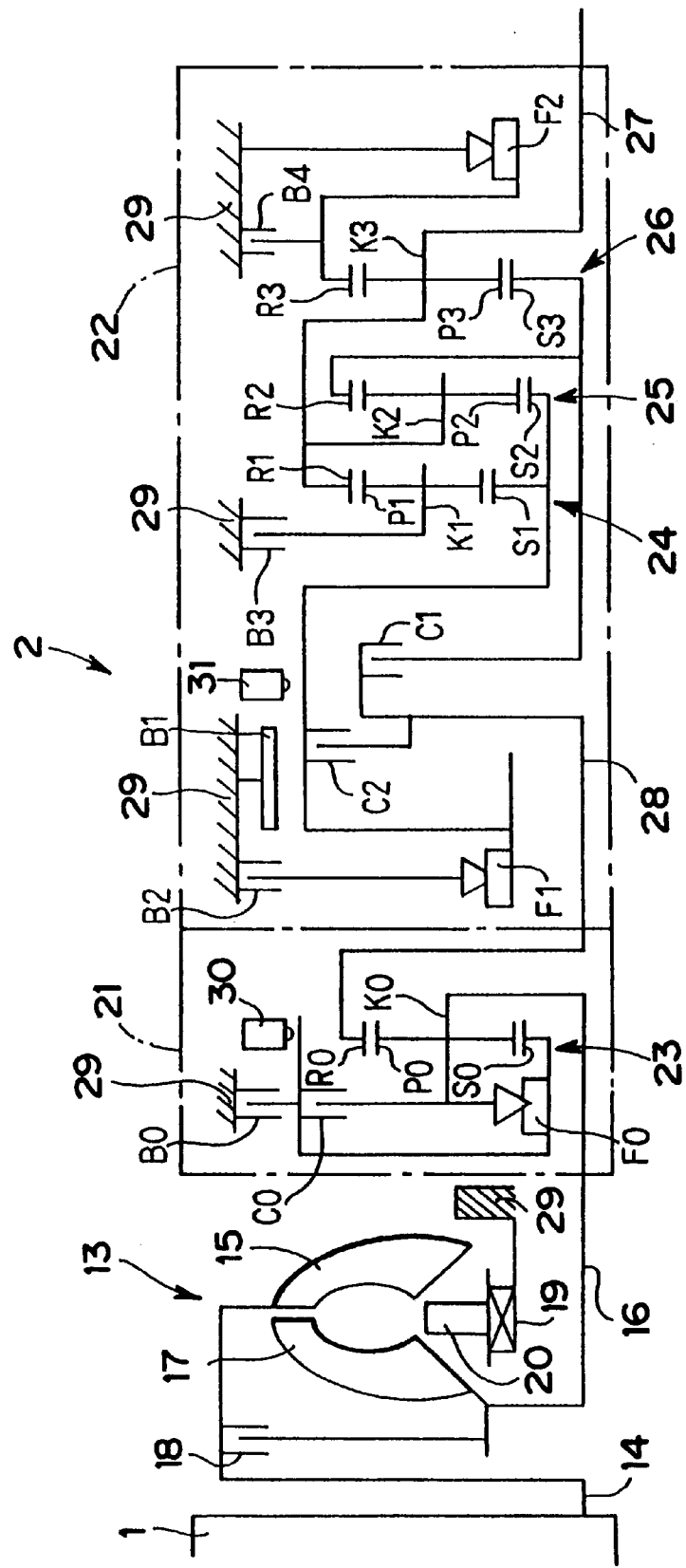
FIG. 17 is a skeleton diagram showing one example of a gear train of the automatic transmission to which is applied the present invention.

The automatic transmission 2 can set five forward and one reverse gear stages, and its gear train is exemplified in FIG. 17. As shown in FIG. 17, the automatic transmission 2 is connected to the engine 1 through a torque converter 13. This torque converter 13 is equipped with: a pump impeller 15 connected to a crankshaft 14 of the engine 1; a turbine runner 17 connected to an input shaft 16 of the automatic transmission 2; a lock-up clutch 18 connecting the pump impeller 5 and the turbine runner 17 directly; and a stator 20 prevented from rotating in one direction by a one-way clutch 19.

The automatic transmission 2 is further equipped with: an auxiliary transmission unit 21 for shifting two high and low stages; and a main transmission unit 22 for shifting the reverse and four forward stages. The auxiliary transmission unit 21 is equipped with: a planetary gear set 23 composed of a sun gear S0, a ring gear R0, and a pinion P0 rotatably supported by a carrier K0 and meshing with those sun gear S0 and ring gear R0; the clutch C0 and a one-way clutch F0 interposed between the sun gear S0 and the carrier K0; and a brake B0 interposed between the sun gear S0 and a housing 29.

The main transmission unit 22 is equipped with: a first planetary gear set 24 composed of a sun gear S1, a ring gear R1 and a pinion P1 rotatably supported by a carrier K1 and meshing with those sun gear S1 and ring gear R1; a second planetary gear set 25 composed of a sun gear S2, a ring gear R2 and a pinion P2 rotatably supported by a carrier K2 and meshing with those sun gear S2 and ring gear R2; and a third planetary gear set 26 composed of a sun gear S3, a ring gear R3 and a pinion P3 rotatably supported by a carrier K3 and meshing with those sun gear S3 and ring gear R3.

The sun gear S1 and the sun gear S2 are integrally connected to each other, and the ring gear R1 and the carriers K2 and K3 are integrally connected to each other. The carrier K3 is connected to an output shaft 27. The ring gear R2 is integrally connected to the sun gear S3. Moreover, a first clutch C1 is interposed between those ring gear R2 and sun gear S3 and an intermediate shaft 28, and the second clutch C2 is interposed between those sun gears S1 and S2 and the intermediate shaft 28.

The housing 29 is equipped with a first brake B1 of band type acting as brake means for braking the rotations of the sun gears S1 and S2. Between these sun gears S1 and S2 and the housing 29, there are interposed a first one-way clutch F1 and a brake B2 in series. The first one-way clutch F1 is applied when the sun gears S1 and S2 are to rotate backward of the input shaft 6.

A third brake B3 is interposed between the carrier K1 and the housing 29, and a fourth brake B4 and a second one-way clutch F2 are interposed in parallel between the ring gear R3 and the housing 29. The second one-way clutch F2 is applied when the ring gear R3 is to rotate backward. The clutches C0, C1 and C2 and brakes B0, B1, B2, B3 and B4 described above are hydraulic frictional engagement elements, the frictional members of which are engaged when the oil pressure is applied thereto.

A C0 sensor 30 is provided for detecting the RPM of the clutch C0 in the auxiliary transmission unit 21, i.e., the input RPM, and a C2 sensor 31 is provided for detecting the RPM of the second clutch C2 in the main transmission unit 22. These sensors 30 and 31 are connected with the T/M ECU 10, as described hereinbefore.

The automatic transmission 2 thus far described is enabled to set the five forward and one reverse gear stages by its individual frictional engagement elements to be applied/released, as tabulated in an application chart of FIG. 18. In FIG. 18: symbols O indicate the applied state; symbols ⓞ indicate the applied state having no relation to the torque transmission; symbols ● indicate the applied state for effecting the engine braking; and blanks indicate the released state.

Figure 19:
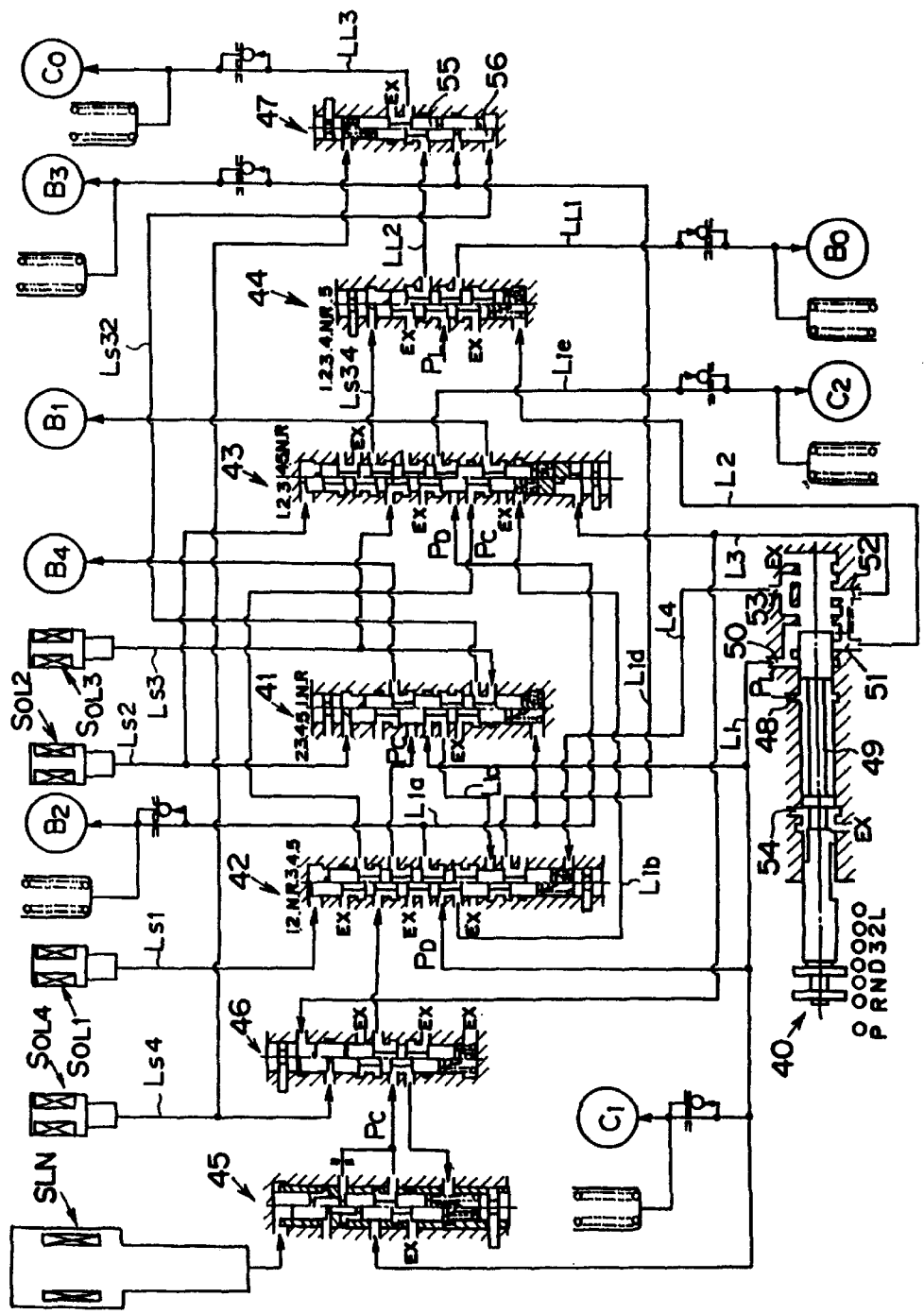
FIG. 19 is a partial hydraulic circuit diagram showing a portion of a hydraulic circuit of the automatic transmission to which is applied the present invention.

The hydraulic control unit 9 is equipped with a hydraulic circuit, as shown in FIG. 19, for setting the individual shift ranges and gear stages shown in FIG. 18. Between a manual valve 40 for receiving the feed of a line pressure PL according to the throttle opening and the hydraulic servo means of the aforementioned individual frictional engagement elements, there are interposed: a 1–2 shift valve 41 for controlling the feed/release of a control pressure PC to/from the fourth brake B4 for the engine braking at the 1st speed; a 2–3 shift valve 42 for controlling the feed/release of a drive range pressure PD to/from the second brake B2 for establishing the 3rd speed; a 3–4 shift valve 43 for controlling the feed/release of the control pressure PC to/from the first brake B1 for the engine braking at the 3rd speed and for controlling the feed/release of the drive range pressure PD to/from the second clutch C2 for establishing the 4th and 5th speeds; and a 4–5 shift valve 44 for switching the feed of the line pressure PL to the brake B0 and the clutch C0.

Further interposed are: a pressure control valve 45 for changing the regulated pressure level during a shift in accordance with the signal pressure of the linear solenoid valve SLN by the initial pressure of the drive range pressure (i.e., D-range pressure) thereby to generate the control pressure PC according to the regulated pressure level; an engine braking relay valve 46 for switching the feed/release of the control pressure PC to/from the 2–3 shift valve 42; and a C0 exhaust valve 47 for switching the feed/release of the line pressure PL to/from the clutch C0 through the 4–5 shift valve 44.

Here: the first shift solenoid valve SOL outputs a signal pressure for switching the 2–3 shift valve 42; the second shift solenoid valve SOL2 outputs a signal pressure for switching the 1–2 shift valve 41; and the third shift solenoid valve SOL3 outputs a signal pressure for switching the C0 exhaust valve 47 through the 1–2 shift valve 41. On the other hand, the fourth solenoid valve SOL4 outputs a signal pressure for switching the engine brake relay valve 46 and the C0 exhaust valve 47, and the linear solenoid valve SLN outputs a signal pressure for regulating the pressure to the pressure control valve 45. Moreover, the frictional engagement elements other than the first brake B1 and the fourth brake B4 are equipped with accumulators.

Here will be described in more detail the constructions and functions of the aforementioned individual units. The manual valve 40 is constructed of a spool valve which is connected by mechanical means such as a cable to the not-shown shift lever acting as a first range switching mechanism. The manual valve 40 is fed at its input port 48 with the line pressure PL so that the input port 48 is opened, as a spool 49 is moved, to communicate with one or more output ports in accordance with the position of the spool 49 thereby to output the line pressure PL to the communicating output port or ports. In the D-position, specifically, the line pressure PL is outputted only from a D-range port 50. In the "3"-position, the line pressure PL is outputted additionally from a "3"-range port 51. In the "2"-position, the line pressure PL is outputted additionally from a "2"-range port 52. In the L-position, the line pressure PL is outputted additionally from an L-range port 53. In the R-position, on the other hand, the line pressure PL is outputted from an R-range port 54. In the N-position, all the output ports are closed. In the P-position, the input port 48 is opened to communicate with a drain port EX. Here, the aforementioned automatic transmission 2 can select the "4"-range, which is a shift range for inhibiting the highest gear stage or the 5th speed. In this "4"-range, the spool 49 rotates on its center axis in the manual valve 40 so that the oil pressure is outputted from the aforementioned "2"-range port 52.

The pressure control valve 45 is equipped with a spool and a plunger which are urged in one direction by a spring. This control valve 45 regulates the D-range pressure PD, as inputted thereto, according to the output signal of the linear solenoid valve SLN and feeds the control pressure PC to the 2–3 shift valve 42 through the engine brake relay valve 46.

The engine braking relay valve 46 is a change-over valve which is equipped with a spool and a plunger, as urged in one direction by a spring. This relay valve 46 is fed at its plunger with the "2"- range pressure and at its spool with the signal pressure of the linear solenoid valve SLN, and switches the feed of the control pressure PC to the 2–3 shift valve 42 by either of the pressures and the release of the control pressure PC from the 2–3 shift valve 42 by the relief of that pressure.

The 2–3 shift valve 42 is a change-over valve equipped with a spool urged in one direction by a spring. This shift valve 42 is fed with the signal pressure of the first shift solenoid valve SOL1 and the L-range pressure, and switches the feeds of the control pressure PC to the 3–4 shift valve 43 and the 1–2 shift valve 41, and the communications of the D-range pressure with oil passages L1a and L1b and the drainage of the same.

The 1–2 shift valve 41 is a change-over valve equipped with a spool urged in one direction by a spring. This shift valve 41 is fed with the signal pressure of the second shift solenoid valve SOL2 and the oil pressure from the oil passage L1a, and switches the feed of the control pressure PC to the fourth brake B4 and the discharge of the same from the brake B4, and the feed of the signal pressure of the third shift solenoid valve SOL3 to an oil passage LS32 and the discharge of the same from the oil passage LS32.

The 3–4 shift valve 43 is a change-over valve equipped with a spool urged in one direction by a spring through a piston. This shift valve 43 is fed with the signal pressure of the second shift solenoid valve SOL2, the oil pressure from the oil passage L1b and an oil pressure from an oil passage L3, and switches the feed and block of the signal pressure of the third shift solenoid valve SOL3 from an oil passage LS3 to and from the 4–5 shift valve 44 via an oil passage LS34, the connection and disconnection between the oil passage L1a and an oil passage L1e, and the feed and discharge of the control pressure PC to and from the first brake B1.

The 4–5 shift valve 44 is a change-over valve which is equipped with a spool urged in one direction by a spring. This shift valve 44 is fed with the signal pressure of the oil passage LS34 and an oil pressure of an oil passage L2, and switches the feed and discharge of the line pressure PL to and from the C0 exhaust valve 47, and the feed and discharge to and from the brake B0 via an oil passage LL1.

The C0 exhaust valve 47 is a change-over valve which is equipped with a spool 55 and a plunger 56, as urged in one direction by a spring. This exhaust valve 47 is fed with the signal pressure of the fourth solenoid valve SOL4 via the oil passage LS4, the signal pressure of the third solenoid valve SOL3 via the oil passage LS32 and an oil pressure of an oil passage L1d, and switches the feed and discharge of the line pressure PL, as fed through the 4–5 shift valve 44, to and from the clutch C0 via an oil passage LL3.

In the shown neutral position of the hydraulic control unit thus constructed, the line pressure PL is fed to the clutch C0 through the 4–5 shift valve 44 and the C0 exhaust valve 47, but the oil passage through the manual valve 40 is closed, so that the oil pressure of the first clutch C1 is drained. In FIG. 19, the displacements of the individual valves across the center lines illustrate the limit positions of the spools to move. Especially for the individual shift valves, the numerals, as divided at the right and left sides of the center lines, indicate the correspondences between the spool positions and the gear stages.

According to the hydraulic control unit, the individual gear stages are set such that the range pressures are regulated whereas the individual shift solenoid valves SOL1 to SOL3 are turned ON/OFF by the electronic controls corresponding to the vehicle speed and the engine load (e.g., the throttle opening) in accordance with the selection of the position of the manual valve, as made by manipulating a shift device. In other words, the individual clutches and brakes are controlled, as illustrated in FIG. 18, so that the individual gear stages can be set in relation to the one-way clutches (OWC), and the engine (E/G) braking state can be established by the output of the signal pressure, as caused by turning ON/OFF the fourth solenoid valve SOL4.

When the signal pressure is outputted from the fourth solenoid valve SOL4 while the 3rd speed is set in the D-range, for example, the spool of the engine braking relay valve 46 is moved to the position, as indicated by the lefthand half of FIG. 19. As a result, the control pressure PC, as originating from the D-range pressure, is fed through the 2–3 shift valve 42 to the 3–4 shift valve 43 thereby to apply the first brake B1. In short, the engine braking is effective at the 3rd speed.

When the signal pressure is outputted from the fourth solenoid valve SOL4 while the 2nd speed is set in the D-range, the oil pressure is fed to one end side of the spool of the C0 exhaust valve 47 so that the spool is moved to the position, as indicated by the lefthand half of FIG. 19. As a result, the line pressure PL, as fed through the 4–5 shift valve 44, is fed to apply the clutch C0 in the auxiliary transmission unit 21 so that the engine braking can be effected at the 2nd speed.

When the signal is outputted from the fourth solenoid valve SOL4 at the 1st speed in the D-range, the control pressure PC is outputted, as in the aforementioned case of the 3rd speed, from the engine braking relay valve 46 to the 2–3 shift valve 42 and is fed from the 2–3 shift valve 42 to the 1–2 shift valve 41 to apply the fourth brake B4. In short, the engine braking can be effected at the 1st speed.

Here, the individual gear stages for the 1st to 5th speeds are set, as in the system of the prior art, by turning ON/OFF the first to third shift solenoid valves SOL1 to SOL3 to switch the individual shift valves 41 to 44 suitably by the output pressures of the solenoid valves, as could be easily understood from the hydraulic circuit of FIG. 19.

Thus in the automatic transmission 2, the individual gear stages can be set by the electric controls, and the engine braking effects at the 3rd or lower gear stages can be set by controlling the fourth solenoid valve SOL4 electrically. By making use of these functions, the control system according to the present invention is enabled to switch the forward ranges electrically.

Figure 20A:
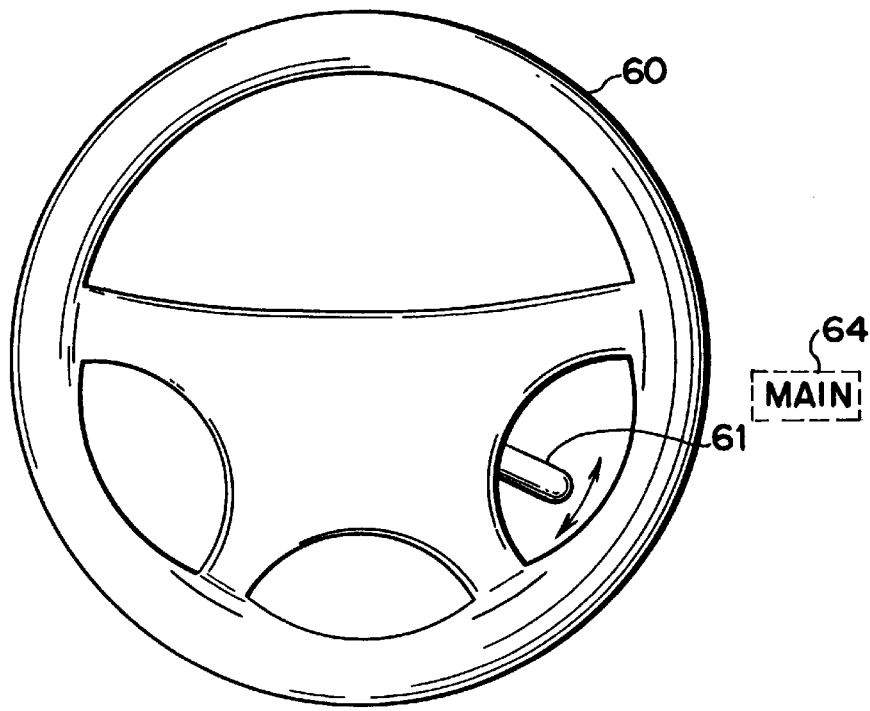
FIG. 20A is a view taken from the front side of a steering wheel and showing a second shift lever or a second range switching mechanism according to the present invention.
Figure 20B:
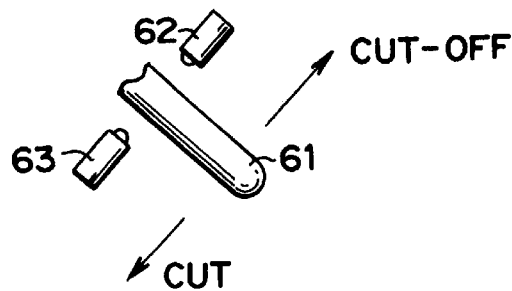
FIG. 20B is an enlarged view showing a portion of the second shift lever.
Figure 20C:
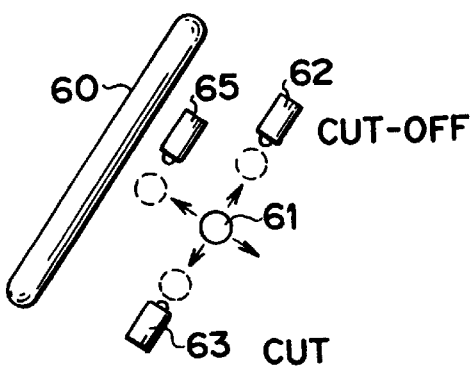
FIG. 20C is a view showing the second shift lever but taken from the side of the steering wheel.

A range switching mechanism, i.e., a second range switching mechanism for switching the forward ranges electrically is exemplified in FIGS. 20A, 20B and 20C. Reference numeral 60 appearing in these figures designates a steering wheel (or handle), and a second shift lever 61 is attached to the (not-shown) steering column having the steering wheel 60 mounted thereon. The second shift lever 61 is so arranged near the steering wheel 60 as to protrude radially from the steering column and is given such a length that it can be manipulated by a finger of the hand gripping the steering wheel 60. Moreover, the second shift lever 61 is so elastically held and normally positioned in a neutral position that it can be turned around the steering column and pulled toward the steering wheel 60.

The turning motion of the second shift lever 61 in the circumferential direction is to increment/decrement the shift ranges and is equipped with switches 62 and 63 for detecting the turning motion. These switches 62 and 63 are the so-called "momentary switches" for outputting signals each time they are turned ON. Of these, the switch 62, as located in a position turned counter-clockwise of FIG. 20A from the neutral position of the second shift lever 61, is a cut-off switch for outputting a signal to switch (or up-range) the shift range to a higher-speed one. The switch 63, as located at the opposite side, is a cut switch for outputting a signal to switch (or down-range) the shift range to a lower-speed one.

These cut-off switch 62 and cut switch 63 are connected with the aforementioned automatic transmission electronic control unit (T/M ECU) 10. These switches 62 and 63 are so constructed that they are active, when the D-range is set by the shift lever of the not- shown shift device, to output their electric signals. This can be achieved by activating the circuits of the switches 62 and 63 when the D-range is selected by the (not-shown) shift lever for switching the aforementioned manual valve 40 mechanically. Alternatively, the individual switches 62 and 63 may be activated by turning ON a main switch 64 which is mounted in a suitable position on the shift device, the instrument panel or the second shift lever 61. Specifically, a M (manual)-position is arranged at the side of the D-range position in the shift device, and the main switch 64 is located at the M-position. In this structure, the main switch 64 is turned ON by the shift lever when the M-position is selected by the driver. The main switch 64 can be exemplified by a momentary switch for outputting its signal only while being turned ON or for a short time just after turned ON. This main switch 64 corresponds to enabling means of the present invention, and the not-shown shift device and the manual valve 40 to be switched by the former correspond to a first range switching mechanism of the present invention.

Moreover, the second shift lever 61 is pulled toward the steering wheel 60 so that the shift range, as electrically set by turning the second shift lever 61 circumferentially of the steering column, may be canceled to restore the D-range. In order to detect this pulling operation of the second shift lever 61, there is provided a return switch 65. This return switch 65 is connected with the T/M ECU 10 so that the signal accompanying the return of the second shift lever 61 may be inputted to the T/M ECU 10. Here, the arranged position and the manipulating directions of the second shift lever 61 are shown in an enlarged scale in FIG. 20C.

The shift range can be switched by manipulating the second shift lever 61 when the manual valve 40 is in the D-range position, that is, when the D-range is selected by the shift device for selecting the shift range mechanically. Specifically, the shift range is incremented or decremented when the cut switch 63 or the cut-off switch 62 outputs its signal in the D-range. This increment/decrement of the shift range is executed by switching the prevailing shift range to one lower or higher by one step. Specifically, each time the cut switch 63 outputs its signal, that is, each time the second shift lever 61 is once turned clockwise of FIG. 20A, the shift range is switched sequentially in the order of D-range→"4"-range→"3"-range→"2"-range→L-range. Each time the cut-off switch 62 outputs its signal, that is, each time the second shift lever 61 is once turned counter-clockwise, on the other hand, the shift range is switched sequentially in the order of L-range→"2"- range→"3"-range→"4"-range→D-range.

Each of these shift ranges is set in advance with the gear stages to be set and to effect the engine braking, and these gear stages are stored in advance as the maps in the ECU 10. There are further stored the ON/OFF patterns of the solenoid valves for effecting the engine braking. Moreover, these shift maps and solenoid patterns are changed to set a predetermined one of the shift ranges each time the cut switch 63 or the cut-off switch 62 is turned ON. In the state of the D-range, the output signal of the cut-off switch 62 is canceled even when this switch 62 is turned ON, because of no higher shift range. In the L-range, the output signal of the cut switch 63 is also canceled even when this switch 63 is turned ON, because of no lower shift range.

As the shift range is switched to a lower one, a downshift may be accordingly caused to increase the engine RPM. For protecting the engine 1, therefore, the output signal of the cut switch 63 is canceled, if this switch 63 is turned ON in the state allowing the overrun of the engine 1, to keep the prevailing shift range. This function is similar to the inhibition of the down-range in the shift device of the prior art.

When the return switch 65 is turned ON, the manual valve 40 is manually moved to set the selected D-range. This setting is executed by changing the shift map for controlling the shift range into one for the D-range and by turning ON/OFF the solenoid valves in accordance with the map.

According to the range control system thus constructed, the shift ranges for the forward runs can be switched by manipulating the second shift lever 61 arranged near the steering wheel 60. As a result, the shift ranges can be switched while the driver is gripping the steering wheel 60 and gazing forward, thereby to improve the shift range switching operation. Moreover, the D-range can be directly set by turning ON the return switch 65 with the second shift lever 61. As compared with the operation in which the cut-off switch 62 turned ON several times to restore the D-range, therefore, the return to the D-range can be facilitated to improve the shift range switching operation better.

Here is considered a vehicle which is equipped with a cruise control system for keeping the running speed constant. This cruse control system is activated, when the second shift lever 61 is manipulated to select the "4"-range, but is inactivated when a lower shift range is selected by manipulating the second shift lever 61. These operations are performed to prevent the vehicle speeds and the gear stages from overlapping.

In the range switching system thus far described according to the present invention, the forward ranges can be shifted from one to another by the electric switching device, and this electric switching can be effected even with the manual valve 40 being set in the D-range. As a result, the switching operation for shifting the forward ranges need not always be accomplished by the second shift lever 61. On the other hand, the mechanical shift device for controlling the manual valve 40 may be constructed to have only the D-range position for the forward runs. These points are considered to exemplify a construction shown in FIG. 21.

Figure 21:
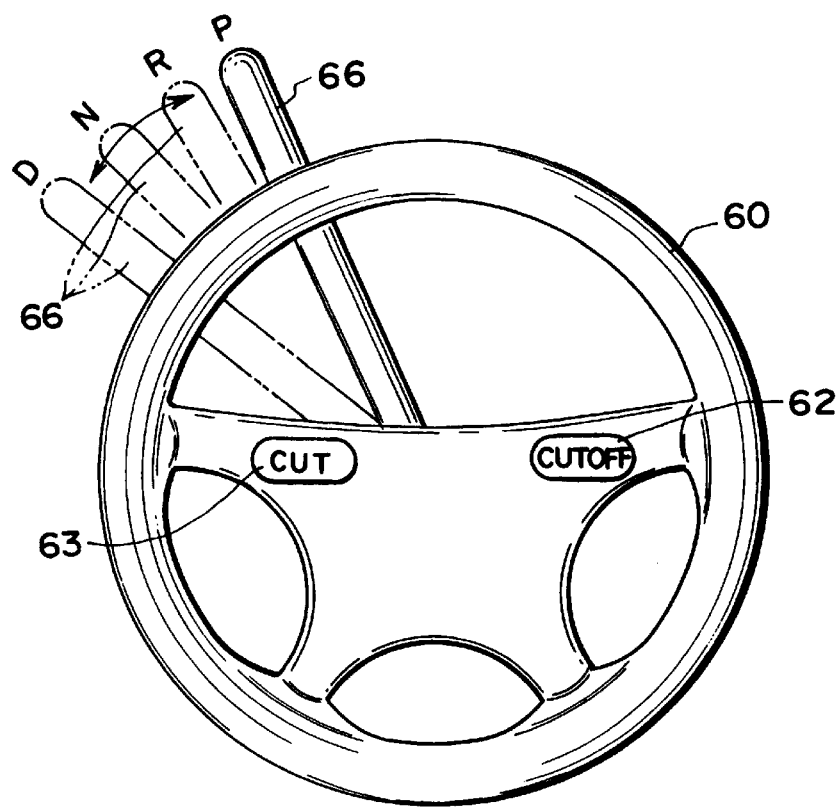
FIG. 21 is a front elevation showing an embodiment, in which a first shift lever or a first range switching mechanism according to the present invention is arranged on a steering column and in which a cut-off switch and a cut switch are fixed to the front side of the steering wheel.

In the construction shown in FIG. 21, a first shift lever 66, as connected to the manual valve 40 by mechanical means such as a cable, is provided to protrude radially of the steering column. This first shift lever 66 is constructed like the lever of the so-called "column type" shift device of the prior art such that it is turned circumferentially of the steering column to switch the manual valve 40. In the example shown in FIG. 21, the first shift lever 66 is provided with the four range positions of the parking (P), reverse (R), neutral (N) and drive (D) positions, which are arranged counter-clockwise sequentially in the recited order, as shown in FIG. 21. Here, it is arbitrary that the (not-shown) shift button has to be depressed between the P-range and the R-range and between the R-range and the N-range. Thus, the first shift lever 66 corresponds to a first range switching mechanism of the present invention.

On the other hand, the cut-off switch 62 and the cut switch 63 for switching the shift ranges electrically in the D-range are arranged near the center of the steering wheel 60. These switches 62 and 63 are constructed of the momentary push button switches. On the other hand, the switches 62 and 63 may be mounted on the steering wheel 60 but may alternatively be mounted on the steering column so that their positions may not be changed by the turn of the steering wheel 60.

The construction, as shown in FIG. 21, not only can achieve effects similar to those obtained by the system having the construction shown in FIG. 20 but also can eliminate the shift device, as arranged sideways of the driver's seat, of the prior art thereby to improve the facilitation for arranging the remaining devices to be mounted on the vehicle. On the other hand, a first shift lever 66 is positioned ahead of the steering wheel 60. However, since the range positions to be selected by the first shift lever 66 are the above-specified four positions, neither the glance of the driver on the (not-shown) meter panel or the center cluster nor the forward field of view can be shielded by the first shift lever 66 thereby to prevent deterioration in the visibility. This visibility of the center cluster or the like can be improved by making the length of the first shift lever 66 as small as possible.

Figure 22:
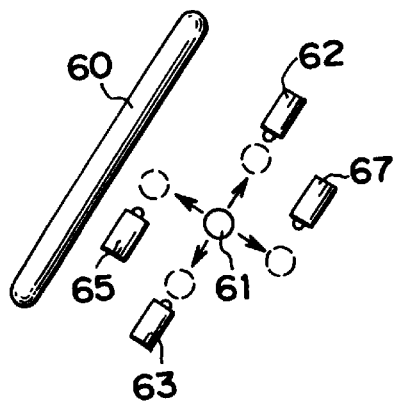
FIG. 22 is a view showing an example of a switch capable of switching to a shift range lower by two stages or more and taken from the side of the steering wheel.

Although the aforementioned return switch 65 controls a return to restore the D-range from a lower shift range, there can be provided a mechanism for performing a similar switching of shift ranges by two or more steps by a single action. This mechanism is exemplified in FIG. 22, in which the second shift lever 61 is so constructed as can be moved from its neutral position apart from the steering wheel 60 (i.e., rightward of FIG. 22) and in which a double-cut switch 67 is provided in addition. This double-cut switch 67 is connected with the T/M ECU 10 so that it is activated to output a signal, when turned ON by the second shift lever 61, thereby to switch the prevailing shift range to one lower by two steps on the basis of the output signal.

As described above, the first shift lever 66 for switching the manual valve 40 mechanically is operated mainly at the running start, and the switching of the shift range during the run is effected mainly by operating the second shift lever 61, the cut-off switch 62 or the cut switch 63. It is, therefore, sufficient that the shift levers for selecting the P-range or the R-range mechanically can select the necessary minimum shift range, and that they can be arranged at the floor sideways of the driver's seat or on the instrument panel as in the ordinary vehicle of the prior art.

Figure 23:
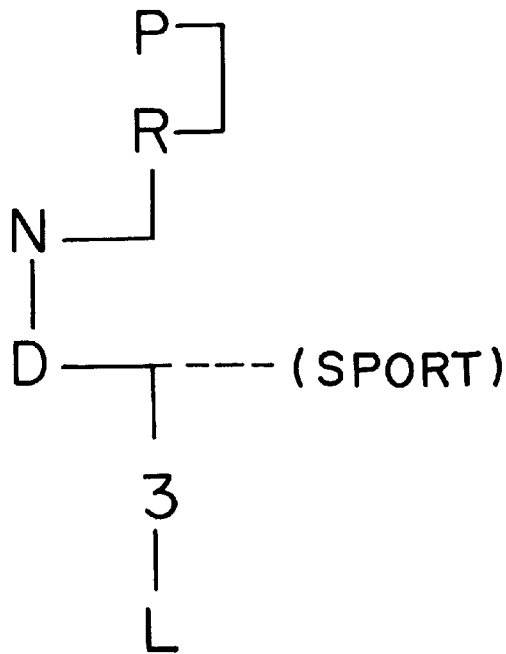
FIG. 23 is a diagram showing an array of the shift positions of the first shift lever which is fixed to a floor or instrument panel for switching the shift range mechanically.

FIG. 23 schematically shows one example of the so-called "gate type shift lever" which is arranged on the floor or the instrument panel. The individual shift positions including the P-range, R-range, N-range, D-range, "3"-range and L-range are arrayed in the recited order from the front side or upper side of the vehicle, as shown in FIG. 23. Here, the solid lines joining the individual shift positions of FIG. 23 indicate the guide grooves for guiding the shift lever being moved. If the shift positions are constructed to enable the so-called "sport mode" to be selected for setting the individual gear stages manually, a shift position for the sport mode may be set in the position, as indicated by "(sport)" in FIG. 23. When the shift range is to be electrically switched, the first shift lever 66 has to be set in the D-range position. For this necessity, an indication of "E" (Electronic) may be made in advance in the D-range position in addition to the indication "D".

Figure 24:
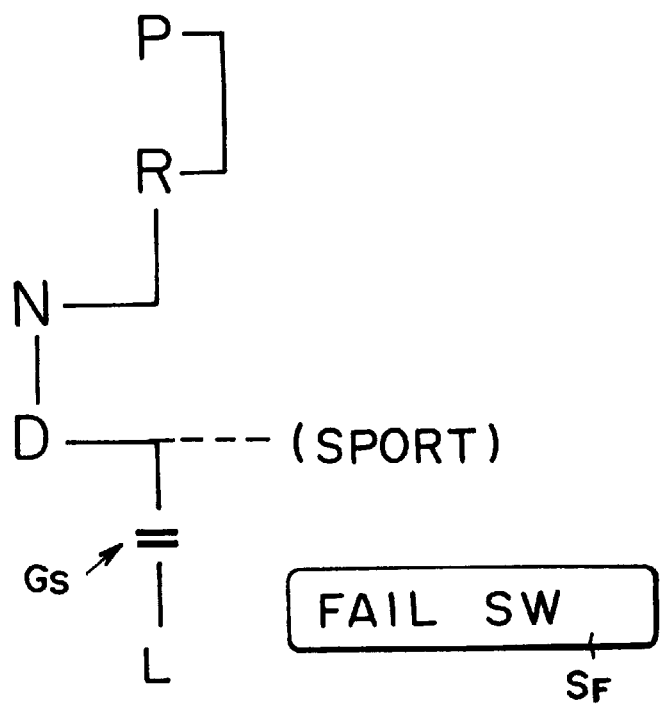
FIG. 24 is a diagram showing another array of the shift positions of the first shift lever which is fixed to the floor or instrument panel for switching the shift range mechanically.

On the other hand, FIG. 24 shows an example which is constructed such that the "3"-range position is eliminated from the construction shown in FIG. 23 and such that a shift to the L-range or the engine braking range is selectively inhibited. Specifically, the forward ranges can be easily selected by the electric switching mechanism including the second shift lever 61 and the cut-off switch 62 or the cut switch 63. It is, therefore, sufficient that the shift device for selecting the shift range mechanically can select the D-range as the forward range and another engine braking range against a failure.

In order to prevent the shift lever from being shifted in the ordinary running state to the engine braking range (i.e., the L-range in the example of FIG. 24), therefore, the construction of FIG. 24 is equipped with a block mechanism GS such as a pin which is fitted in a guide groove so that it may be opened to allow the shift lever to move to the L-range position by operating a fail switch SF arranged in a suitable position. Here, the fail switch SF and the block mechanism GS may be connected either electrically or through mechanical means such as a link.

Moreover, the cut-off switch 62 for outputting the up-range signal and the cut switch 63 for outputting the down-range signal can be attached to the front (facing the driver) and the back (facing the instrument panel) of the steering wheel 60.

Here will be described the aforementioned indicators 11 and 12. When the cut-off switch 62 or the cut switch 63 is turned ON to switch the shift range, the manual valve 40 is left fixed in the D-range position, and the second shift lever 61 has restored the neutral position. Moreover, the cut-off switch 62 and the cut switch 63 have restored their states before operated, too, when they are constructed of push button switches. As a result, when the cut switch 63 or the cut-off switch 62 is operated, the shift range is switched, but the switching mechanism for the switching operation has made no change so that the actually set shift range cannot be visually known. Therefore, the shift range, as selected by the shift device or the switching operation, is indicated by the indicator 11 or 12.

Figure 1:
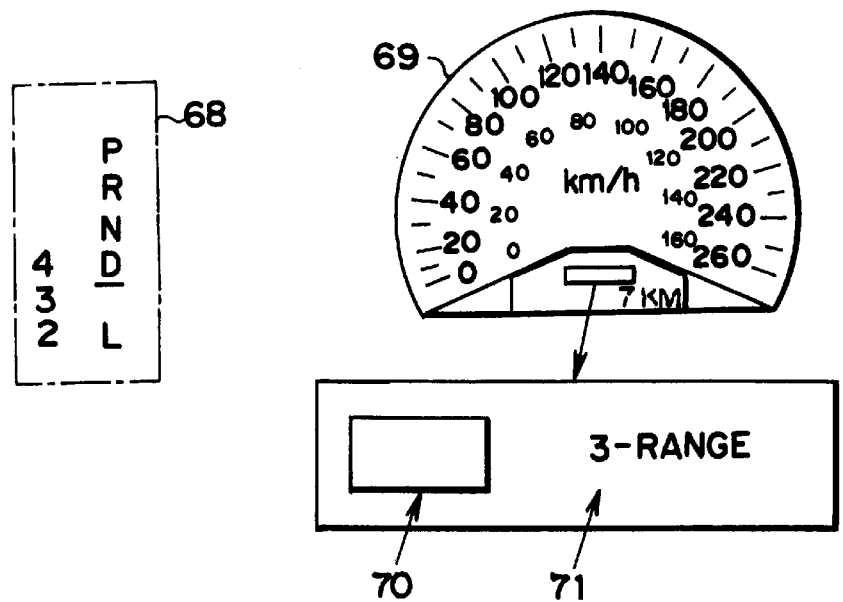
FIG. 1 is a schematic diagram showing one example of an indicator of a shift range.

This indication is exemplified in FIG. 1, in which there is provided a lever position display unit 68 for displaying one of letters P, R, N, D, 4, 3, 2 and L, as corresponding to the position of the shift lever for operating the manual valve 40 mechanically. This display unit corresponds to first display means of the present invention, for which is adopted a structure for lighting one of the letters or for causing it to appear selectively on a crystal liquid board. Here, the display is controlled on the basis of the shift position signal which is to outputted by detecting the operated position of the shift lever for operating the manual valve 40 mechanically.

Moreover, a speed meter 69 is provided therein with an enabling display unit 70 for displaying the state, in which the main switch 64 is turned ON so that the shift range can be electrically switched, and an electric range display unit 71 for displaying the shift range which is electrically set. The former enabling display unit 70 corresponds to second display means of the present invention, as constructed to cause a word "MAIN" to appear when the main switch 64 is turned ON so that the shift range can be switched by the cut switch 63 or the cut-off switch 62. On the other hand, the electric range display unit 71 corresponds to third display means of the present invention, as constructed to display in letters the shift range which is set by operating the cut switch 63 or the cut-off switch 62.

Here, the electric range display unit 71 is electrically set to display the shift range. When there is no display in the enabling display unit 70, no display is made in the electric range display unit 71 so that the D-range is not displayed in the electric range display unit 71.

Figure 2:
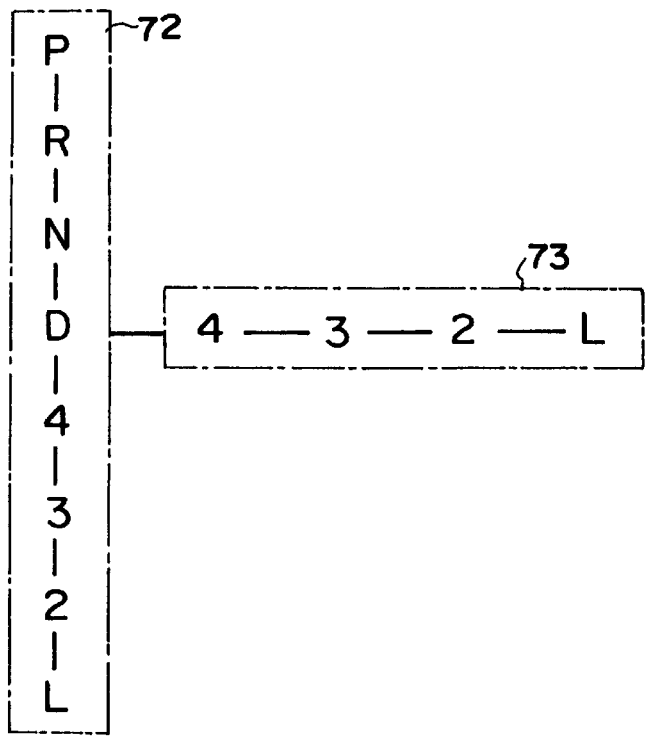
FIG. 2 is a schematic diagram showing another example of an indicator of a shift range.

FIG. 2 shows another example of the display unit. There is provided a lever position display unit 72 for displaying vertically in sequence in the instrument panel that of letters P, R, N, D, 4, 3, 2 and L, which corresponds to the position of the shift lever for operating the manual valve 40 mechanically. This display unit corresponds to first display means of the present invention, for which is adopted a structure for lighting those letters selectively and for displaying them selectively on the liquid crystal board. Here, this display may be controlled on the basis of the shift position signal which is to be outputted by detecting the operated position of the shift lever for operating the manual valve 40 mechanically.

Sideways from the position of the letter "D", there are sequentially arrayed the letters 4, 3, 2 and L, so that, when the cut switch 63 or the cut-off switch 62 is operated to switch the shift range, the letter corresponding to the actually set shift range is lighted. These letters, as arrayed sideways and selectively lighted, provide an electric range display unit 73, which corresponds to the third display means of the present invention. Here, with a construction in which all the letters of the electric range display unit 73 are displayed in specific colors or flashed by turning ON the main switch 64, this electric range display unit 73 also acts as the second display means of the present invention.

Figure 3:
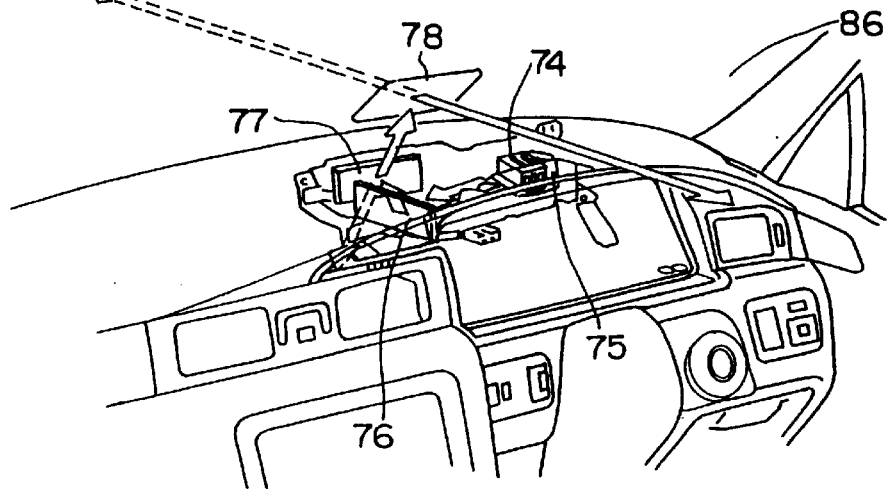
FIG. 3 is a schematic view showing a construction of a head-up display.
Figure 4:
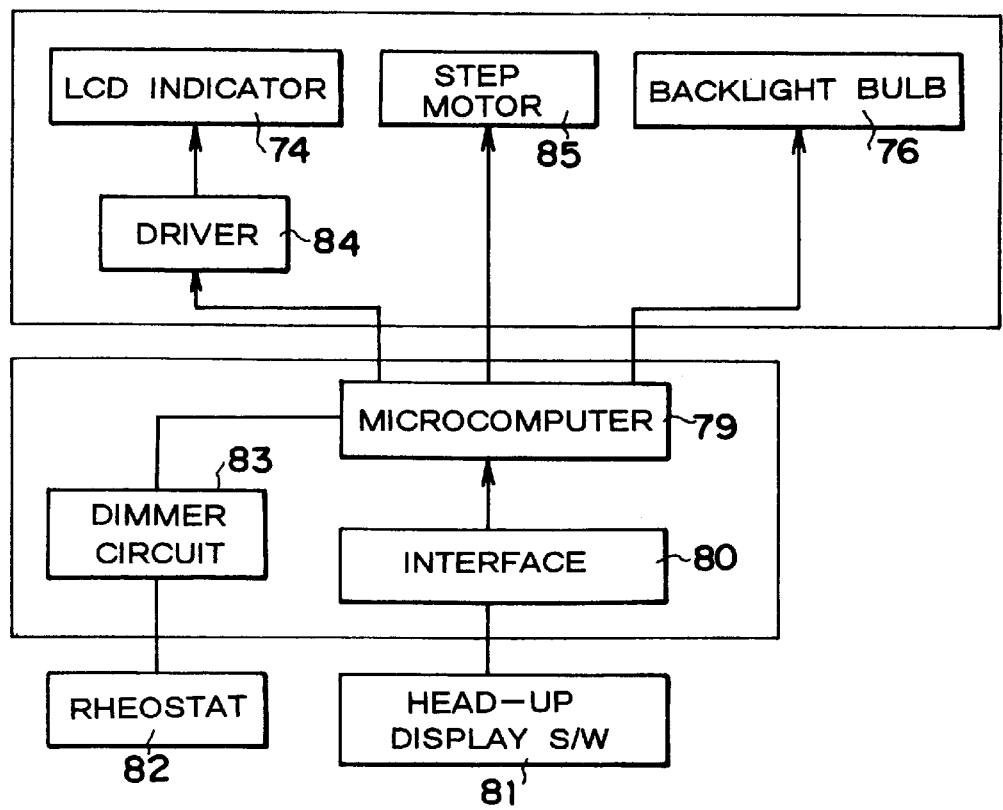
FIG. 4 is a control block diagram of the head-up display.

On the other hand, the means for displaying the shift range which is electrically set by operating the cut switch 63 or the cut-off switch 62 can be exemplified by a head-up display (HUD), as shown in FIGS. 3 and 4. Reference numeral 74 appearing in FIG. 3 designates an LCD display (i.e., liquid crystal digital display), which is constructed to display the "ESR" (electronic shift range) indicating the state, in which the shift range can be electrically selected by turning ON the main switch 64, and to display the electrically set shift range.

This LCD display 74 is equipped with a backlight 75 and a mirror 76, which are arranged to confront each other. In a position to receive the light reflected from the mirror 76, moreover, there is arranged a hologram lens 77 for forming a virtual image on the inner side of the compartment with the light coming from the mirror 76. This virtual image is reflected by a combiner 78 in a garnish, as arranged over the (not-shown) instrument panel, and focused as a display image outside of the compartment. Thus, the display "ESR" for selecting the shift range electrically and the shift range itself can be confirmed by observing that virtual image through a windshield 86.

FIG. 4 is a control block diagram of the head-up display. With a microcomputer 79, there are connected through an interface 80 a head-up display switch 81 and a dimmer circuit 83 to be adjusted by a rheostat 82. Moreover, the LCD display 74 is connected through a driver 84 with the microcomputer 79, and the backlight 75 is controlled by the microcomputer 79. Here, a head-up display step motor 85 is connected with the microcomputer 79. This head-up display step motor 85 is constructed to change the angle of the hologram lens 77 thereby to adjust the vertical position of the displayed image which can be observed through the windshield 86.

Figure 5:
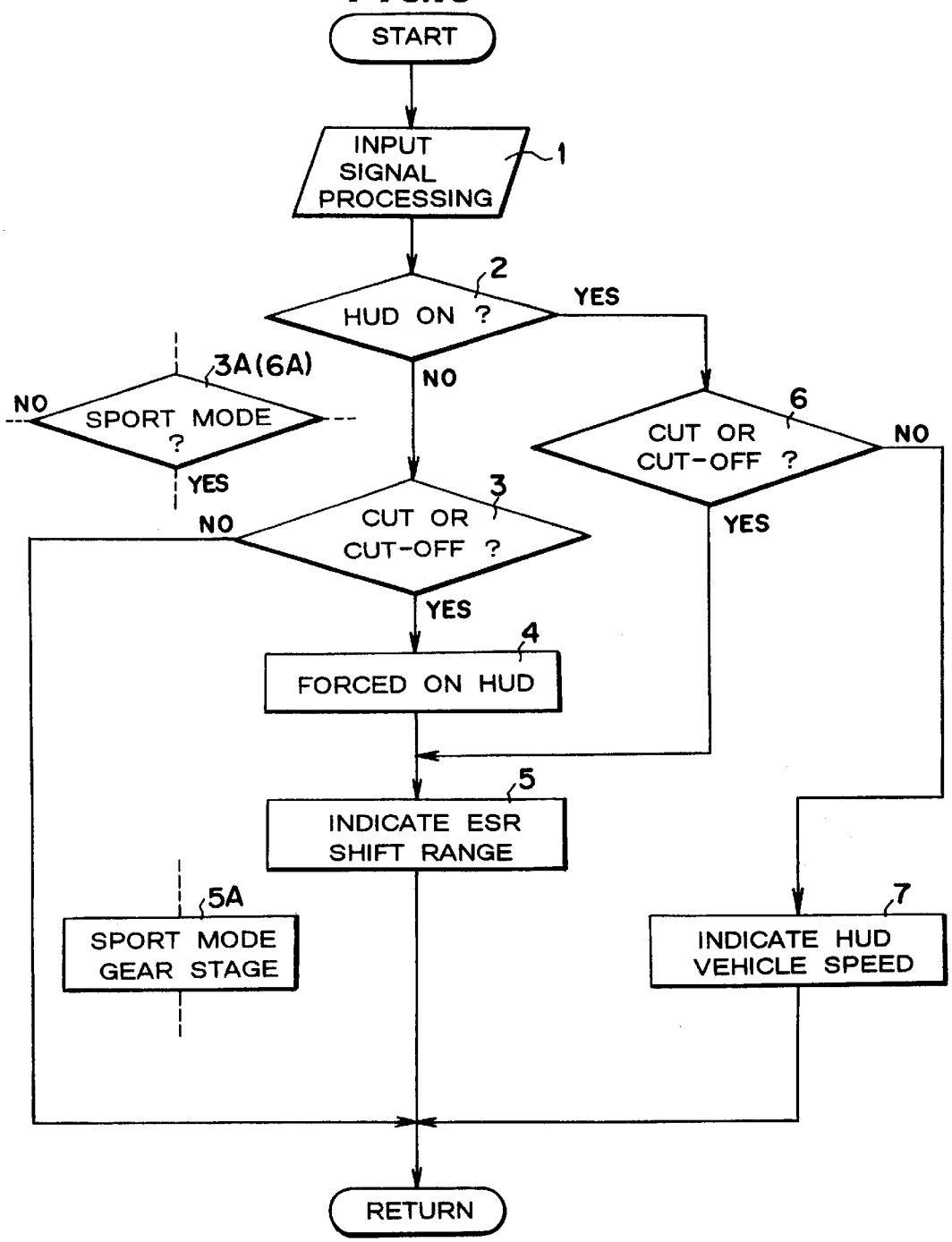
FIG. 5 is a flow chart showing one embodiment of a control routine for displaying information on a shift range to be electrically set, on the head-up display.

FIG. 5 is a flow chart showing one embodiment of the control routine of the aforementioned head-up display. After an input signal processing (of Step 1) mainly for reading the data, it is decided (at Step 2) whether or not the head-up display is ON. This decision of Step 2 can be made depending on whether or not the aforementioned head-up display switch 81 is turned ON to output its signal. When the head-up display switch 81 is OFF so that the answer of Step 2 is NO, the routine advances to Step 3, at which it is decided whether or not the signal is outputted by operating the cut switch 63 or the cut-off switch 62.

When the answer of Step 3 is NO, the routine is returned without any operation. When the cut signal or the cut-off signal is outputted, on the other hand, the head-up display is forcibly turned ON (at Step 4). Specifically, the head-up display switch 81 is manually turned ON/OFF to take the OFF state usually. When the shift range is electrically switched, the head-up display is forcibly activated to display the shift range based on the switching operation. Simultaneously with this, the aforementioned LSD display 74 displays both the "ESR" and the electrically set shift range (at Step 5) so that the virtual image is formed in front of the windshield 86 shown in FIG. 3, as described hereinbefore.

When the head-up display switch 81 is turned ON to affirm the answer of Step 2, on the other hand, the routine advances to Step 6, at which it is decided whether or not the cut signal or the cut-off signal is outputted. When the answer of Step 6 is YES, the routine advances to Step 5, at which the display of the "ESR" and the display of the electrically set shift range are made. When the answer of Step 6 is NO, the vehicle speed is displayed in the head-up display (at Step 7).

Here, the head-up display can display a variety of information in addition to the aforementioned information of shift range, and may display an instructed direction as an arrow in parallel when the forward direction is instructed by a navigation system, for example.

In place of the aforementioned information on the electrically set shift range, moreover, the information on a sport mode can be displayed on the head-up display. Specifically, the sport mode belongs to a shift mode for setting the gear stage of the automatic transmission 2 in accordance with the signal based upon the manual operation. In place of the decision of Step 3 or 6, it is decided (at Step 3A or 6A) whether or not the sport mode is set. When this sport mode is set, the head-up display may be forcibly turned ON, and the manually set gear stage or the sport mode gear stage may be displayed in the head-up display (at Step 5A).

Here, the priority of the head-up display is given to the information on the electric shift range and then to the information in the sport mode, the information in the navigation system and the vehicle speed.

With the construction thus made, whether or not the shift range can be switched by the electric operation, and the electrically set shift range itself can be visually recognized to improve the conveniences of the switching of the shift range.

As described hereinbefore, the cut-off switch 62 and the cut switch 63 are given their functions when activated by operating the main switch 64. In other words, the shift range is not switched even by operating the cut-off switch 62 or the cut switch 63 when the switches are not activated by the main switch 64. This is to prevent the shift range from being switched when the switch 62 or 63 is miss-touched. On the other hand, the main switch 64 is a switch of momentary type for outputting a signal, whenever depressed once, and this signal is inputted to the T/M ECU 10 so that the main switch 64 is decided and switched between active and inactive states by the ECU 10. In this case as shown in FIG. 6, this ECU 10 decides the ON state of the main switch 64 when the ON state of the main switch 64 continues for a predetermined time period of TA seconds or longer and when the OFF state continues for a predetermined time period of TB seconds or longer after the main switch 64 is turned OFF. This construction is made so as to demand the reliable operation of the main switch 64 and to eliminate the instantaneous OFF state, as might otherwise be invited by disturbances.

The active and inactive states of the cut-off switch 62 and the cut switch 63 are decided and held by the ECU 10, as described above. When the (not-shown) ignition switch of the vehicle is turned OFF to interrupt the power supply, the cut-off switch 62 and the cut switch 63 restore the inactive states. These active states are kept even when the shift lever for switching the manual valve 40 mechanically is shifted from the P-range to the L-range and when the brake is applied or released.

Since the ECU 10 decides and sets the active and inactive states on the basis of the ON of the main switch 64, it corresponds to control means of the present invention. As a result, the ON of the main switch 64 neither activates the switches 62 and 63, nor the ON inactivates the same, but the ON signals, as outputted from the main switch 64, functions as a trigger for switching the active state and the inactive state. Thus, the following controls are executed when the main switch 64 fails.

FIG. 7 tabulates the modes of fail of the main switch 64. If the main switch 64 fails ON when the initial state set by the ECU 10 is active, the signal of the main switch 64 is held ON so that the OFF state will not continue for the aforementioned TB or longer. As a result, the ECU 10 will not receive the signal for switching the active state to the inactive state. As a result, the active state is continued so that the "MAIN" will appear in the enabling display unit 70 shown in FIG. 1, for example. When the main switch 64 fails OFF, on the other hand, the ON signal is not outputted from the main switch 64 so that the signal for switching the active state to the inactive state is not inputted to the ECU 10, too. As a result, the active state is continued, and the display "MAIN" is continued. In short, even if the main switch 64 of momentary type should fail ON or OFF in the active state, this active state is continued as it is, and the display indicates the active state, so that the driver can be informed accurately and reliably of the operating state of the automatic transmission 2.

No matter whether the main switch 64 should fail ON or OFF when the initial state set by the ECU 10 is inactive, the ECU 10 does not receive the switching signal, as described above, so that the inactive state is continued. The "MAIN" is not displayed in the enabling display unit 70, as shown in FIG. 1, so that the driver can be informed of the inactive state in view of the enabling display unit 70. According to the system thus far described, the active state and the inactive state can be accurately known even if the main switch 64 fails.

Even when the main switch 64 fails ON, the state is switched to the inactive state by turning OFF the ignition switch. Simultaneously as the main switch 64 is fails ON when this ignition switch is then turned ON again, the main switch 64 outputs the ON signal. Since this ON state is not based upon the operation of the driver, the ECU 10 is desired not to receive the ON state. In other words, the ECU 10 is desired to recognize the ON signal, as shown in FIG. 8, if outputted by the main switch 64 after lapse of a predetermined time period of TC seconds after the ignition switch is turned ON (i.e., IG ON).

Figure 9:
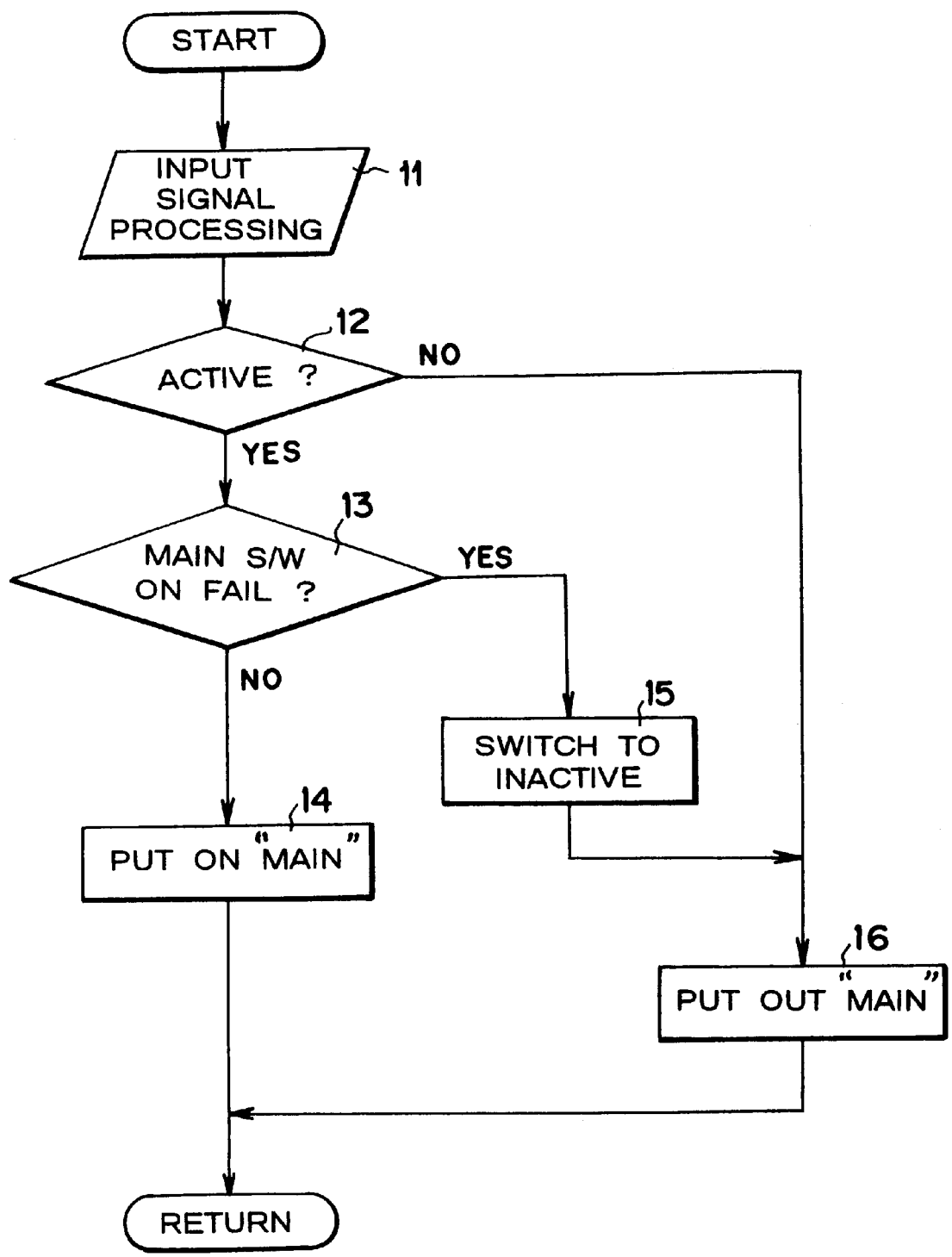
FIG. 9 is a flow chart showing one embodiment of a control routine for effecting the control and display, as accompanying the fail of the main switch in an acting state.

FIG. 9 is a flow chart showing another control embodiment when the main switch 64 fails. First of all, the input signals are processed (at Step 11), and it is then decided (at Step 12) whether or not the active state has been set. If in the acting state, it is decided (at Step 13) whether or not the main switch 64 fails ON. This decision can be made from the fact that the ON signal being continuously outputted from the main switch 64 is continued for a predetermined or longer time period.

When the main switch 64 does not fail, that is, when the answer of Step 13 is NO, the "MAIN" is displayed (at Step 14) in the enabling display unit 70 shown in FIG. 1, for example. When the main switch 64 fails ON so that the answer of Step 13 is YES, on the other hand, the ECU 10 executes the control of the switching to the inactive state (at Step 15). Simultaneously with this, the display of the "MAIN" in the enabling display unit 70 shown in FIG. 1 is put out (at Step 16). Here, when the answer of Step 12 is NO because of inactive state, the routine instantly advances to Step 16.

According to this control shown in FIG. 9, the system for switching the shift range electrically cannot be used in the fail state so that the shift range is switched by the shift lever or the first shift range switching mechanism.

The fail of the electric shift range switching system including the aforementioned cut-off switch 62 or the cut switch 63 may be caused not only by the ON fail or OFF fail of the switches 62 or 63 but also by the fail of the solenoid valve for setting the engine braking state or the signal line for driving the solenoid valve or by the fail of an oil pressure related device. Since, in this case, the shift range is not switched even by operating the second shift lever 61, the cut-off switch 62 or the cut switch 63, the foot brake may be frequently applied. In order to avoid this situation, the system according to the present invention is constructed to execute the following controls.

Figure 10:
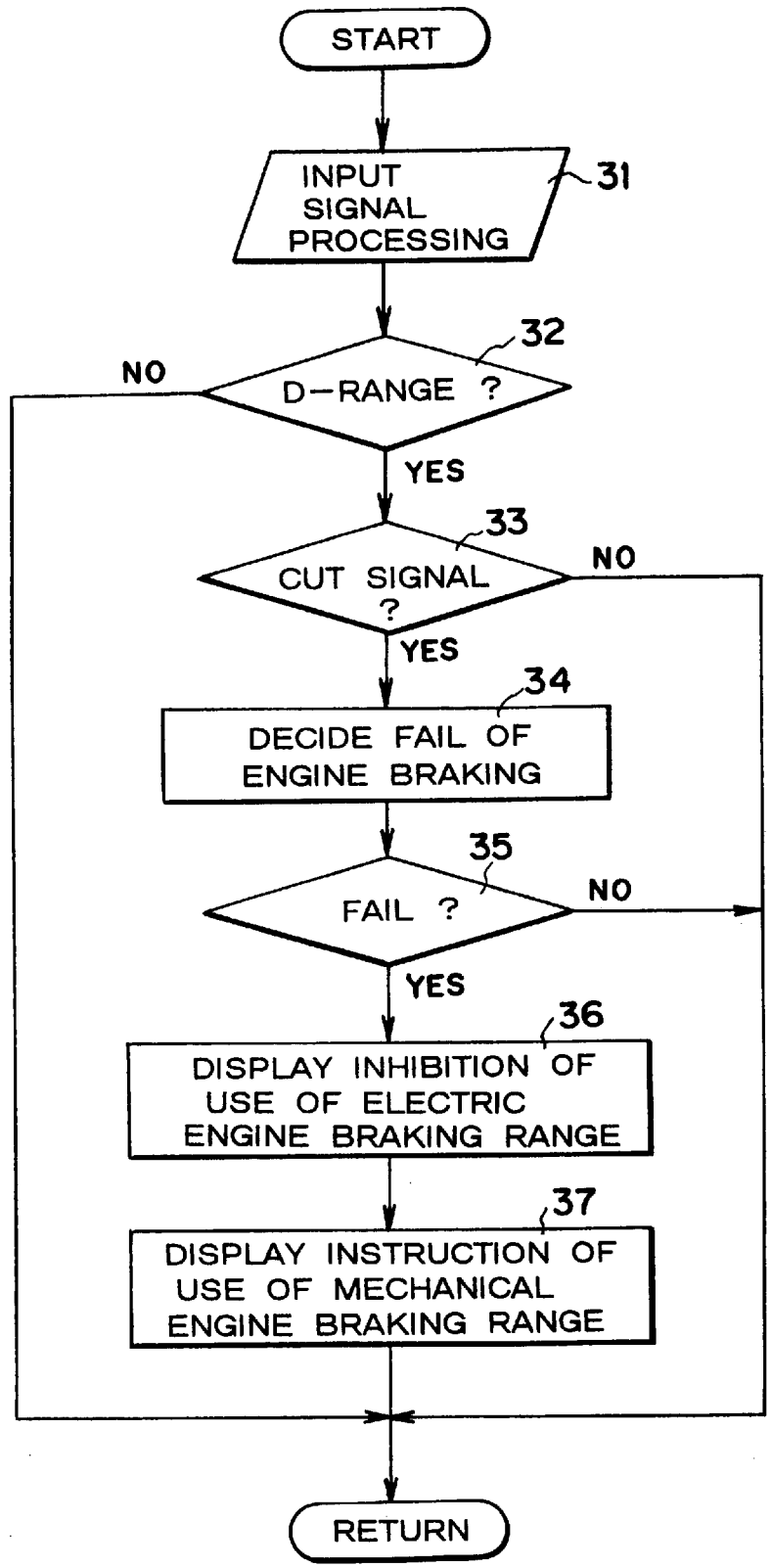
FIG. 10 is a flow chart showing one embodiment of a control routine when an engine braking range cannot be electrically set.

FIG. 10 shows an embodiment of the controls. After the input signals were processed (at Step 31), it is decided (at Step 32) whether or not the D-range has been set. This D-range is set by operating the manual valve 40 mechanically, and its decision can be made in terms of the output signal of the shift position sensor in the shift device, acting as the first range switching mechanism. Here, the reason why the decision of the D-range at Step 32 is to switch the shift range electrically while the manual valve 40 is in the D-range position.

When the D-range is not set so that the answer of Step 32 is NO, this routine is left without any control. When the D-range is set, on the other hand, it is decided (at Step 33) whether or not the cut signal has been outputted. In other words, it is decided whether or not the aforementioned cut switch 63 has been turned ON to output its signal. When the answer of Step 33 is NO, this routine is left without any control.

When the answer of Step 33 is YES because the cut signal is outputted to instruct to switch the shift range to a medium or lower shift range for effecting the engine braking, the fail of the engine braking is decided (at Step 34). This fail decision of the engine braking can be made by a variety of methods, as depending upon whether or not the product of the gear ratio set at that time and the input RPM is substantially equal to the RPM of the output shaft. At the coasting time, alternatively, the decision can be made depending upon the magnitude of the deceleration for effecting the engine braking.

Figure 11:
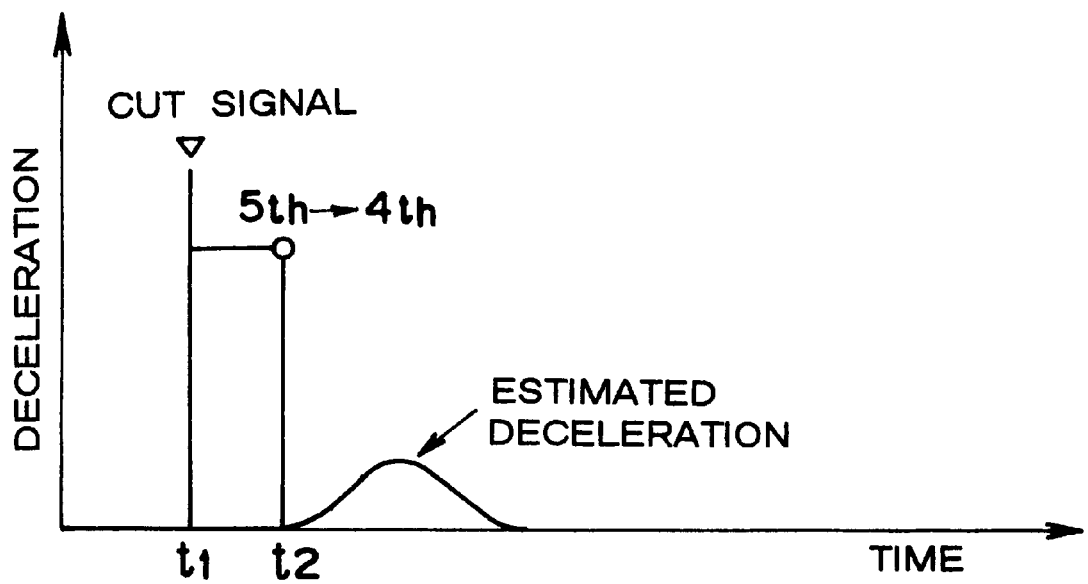
FIG. 11 is an explanatory diagram for explaining a deceleration at which the engine braking occurs according to a down-range.
Figure 12:
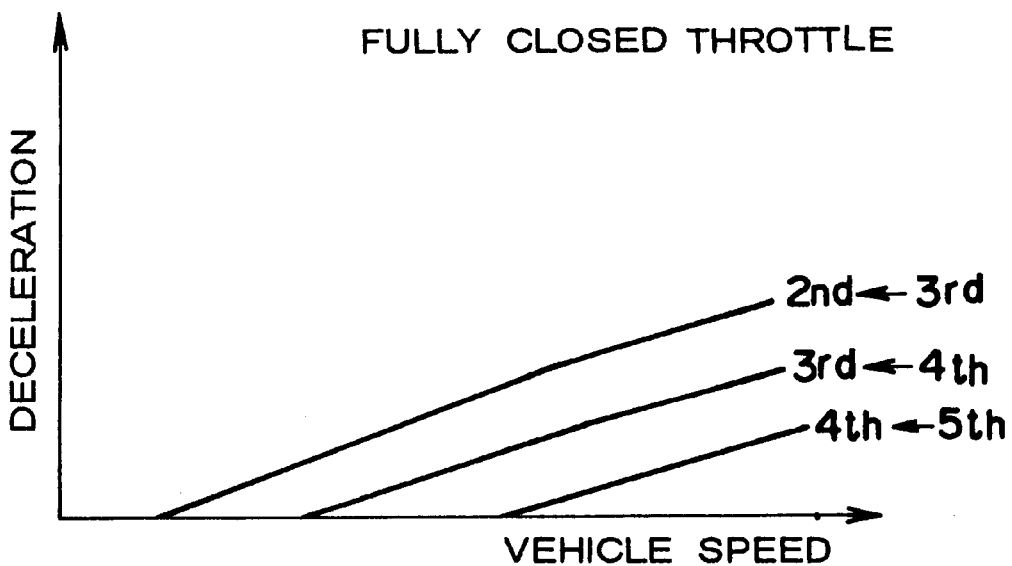
FIG. 12 is a diagram illustrating the decelerations of individual shift patterns against a vehicle speed.

If the cut signal is outputted at an instant t1 and a downshift from the 5th speed to the 4th speed occurs at an instant t2, as illustrated in FIG. 11, a deceleration G is predicted according to the running state such as the vehicle speed at this time. On the other hand, the deceleration in the fully closed throttle state, as illustrated in FIG. 12, is substantially determined by the vehicle speed or the shift pattern. Therefore, the engine braking functions in a normal state if the comparison of the predicted deceleration and a predetermined deceleration reveals that they are substantially equal. With a considerable difference between the predicted deceleration and the predetermined deceleration, on the contrary, it is concluded that the engine braking has failed. This fail decision is made at Step 35, and the routine is left when the answer of Step 35 is NO because of no fail. When it is decided that the fail has occurred, the inhibition of use of the electric engine braking range is displayed (at Step 36).

In short, the display is made to inform the driver of the inhibition of switching of the shift range by the cut switch 63. Simultaneously with this, another display is made to instruct the use of the engine braking range by the mechanical operation (at Step 37). In short, the display is made to urge the driver to switch the shift range by the shift lever in the shift device.

These displays of Steps 36 and 37 can adopt a variety of constructions, if necessary, in which letters can be displayed in the meter panel or head-up display or in which the aforementioned various display units may be flashed or in which the display colors may be changed. It is also possible to adopt an audio display. Thus, the operation of Step 35 corresponds to electric switching inhibition detecting means of the present invention, and the operation of Step 37 corresponds to manual switching display means thereof. Moreover, the operation of Step 33 corresponds to electric shift detecting means of the present invention, and the operation of Step 34 includes deceleration detecting means and electric switching inhibition state detecting means thereof.

When the shift range cannot be electrically switched by the control, as shown in FIG. 10, the shift lever of the shift device is operated to switch the manual valve 40. As a result, even when the shift solenoid valve or the fourth solenoid valve SOL4 and the like fails to become inactive, the oil passage can be switched by the manual valve 40 to set a predetermined engine braking range so that the frequency of using the foot brake can be lowered by effecting the engine braking. Here, this engine braking effecting control may resort to that which is disclosed in Japanese Patent Laid-Open No. 42682/1996 (i.e., JPA-8-42682), for example.

Figure 13:
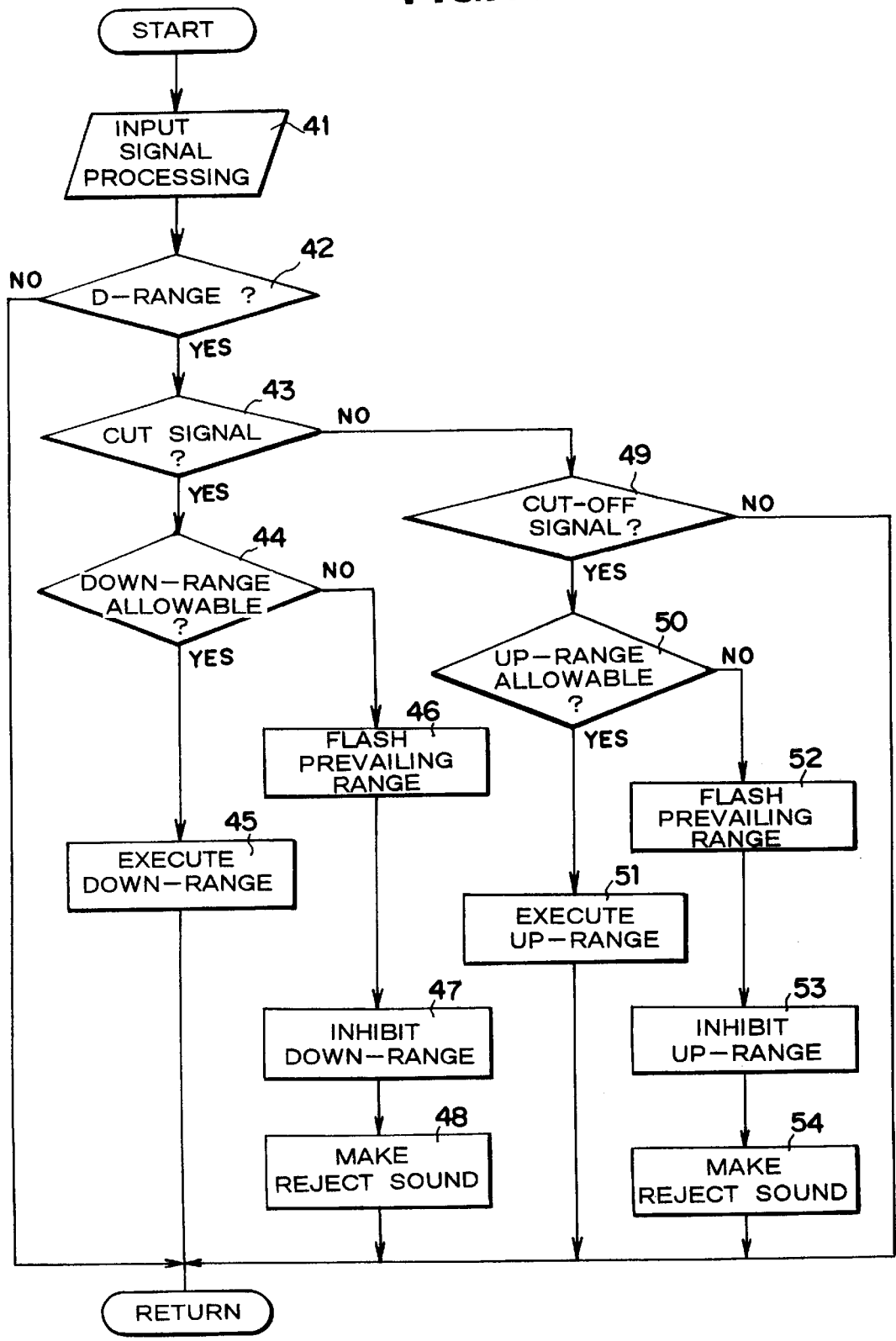
FIG. 13 is a flow chart showing one embodiment of a control routine when a shift range is electrically switched.

When the shift range is switched by the electric control to operate the cut-off switch 62 or the cut switch 63, a gear change may occur depending upon the running state such as the then prevailing vehicle speed, or the engine braking state may arise. Accordingly, the drive force or the engine RPM may change. When it is necessary to stabilize the vehicle or to prevent the over-revolution of the engine, the switching of the shift range has to be inhibited. In other words, the control to reject the shift range by the electric operation may be executed. In the system according to the present invention, this rejection control is executed in the manner, as shown in FIG. 13.

After the input signal processing (at Step 41), it is decided (at Step 42) whether or not the D-range capable of switching the shift range electrically is set by the mechanical shift device. This operation is a control similar to that of Step 32 shown in FIG. 10. When the D-range is not set so that the answer of Step 42 is NO, the routine is left without any control.

When the D-range is set, on the other hand, it is decided (at Step 43) whether or not the cut signal has been outputted by turning ON the aforementioned cut switch 63. When this cut signal is outputted, the control to switch the shift range to a range lower by one stage is executed, and a downshift may accordingly occur. When the answer of Step 43 is YES, it is decided (at Step 44) whether or not a down-range for switching the shift range to a range lower by one stage is allowed. This decision is made upon whether or not the over-revolution of the engine will occur, on the basis of the prevailing vehicle speed and the gear ratio after the down-shift. Alternatively, whether or not the down-shift is allowed can be decided on the basis of the decision of the stability of the vehicle by the vehicle stability control system (VSC).

The down-range, if affirmed to be possible at Step 44, is executed (at Step 45). When it is decided that the down-range is impossible, on the other hand, the display of the then set prevailing range is flashed (at Step 46). Specifically, the shift range, as displayed in the electric range display unit 71 of FIG. 1, is flashed. This flash may be performed several times or continued for a predetermined time period. Here, only a down-range from the D-range to the "4" range may be effected by flashing the display of the D-range in the electric range display unit 71, although the D-range is not a shift range to be electrically set.

Moreover, the down-range is inhibited (at Step 47), and a reject sound indicating the rejection of the instruction of the shift range by the electric operation is made (at Step 48). This reject sound may be repeated every predetermined time periods or made by a predetermined number of times.

When the cut signal is not outputted to deny the answer of Step 43, on the other hand, it is decided (at Step 49) that the cut-off switch 62 is turned ON to output the cut-off signal. When the answer of Step 49 is NO, this routine is left without any control.

When the cut-off signal is outputted, on the other hand, it is decided (at Step 50) whether or not an up-range for switching the shift range to a higher range is allowed. This decision of Step 50 can be made on the basis of either the signal coming from the VSC, for example, or the data obtained from the navigation system. When the up-range is allowed to affirm the answer of Step 50, it is executed (at Step 51).

When the up-range is not allowed to deny the answer of Step 50, on the other hand, the display of the prevailing range is flashed (at Step 52). This control is similar to the aforementioned one of Step 46. Then, the control of inhibiting the up-range is executed (at Step 53), and the reject sound indicating the rejection of the instruction of the up-range is made (at Step 54). This control of Step 54 is similar to the aforementioned one of Step 48.

Here, the flashing display of the prevailing range at Step 46 or 52 emphasizes the displays of the prevailing range, and corresponds to emphasizing display means of the present invention. Thus, it is sufficient to emphasize the display of the prevailing range, and the display mode may be exemplified not only by the flashing method but also by enlarging the letters or changing the display colors for the suitable emphasis.

By the controls shown in FIG. 13, therefore, it is enabled to know not only the running state, in which neither the down-range nor the up-range can be executed, but also the shift range which is actually set.

Figure 14:
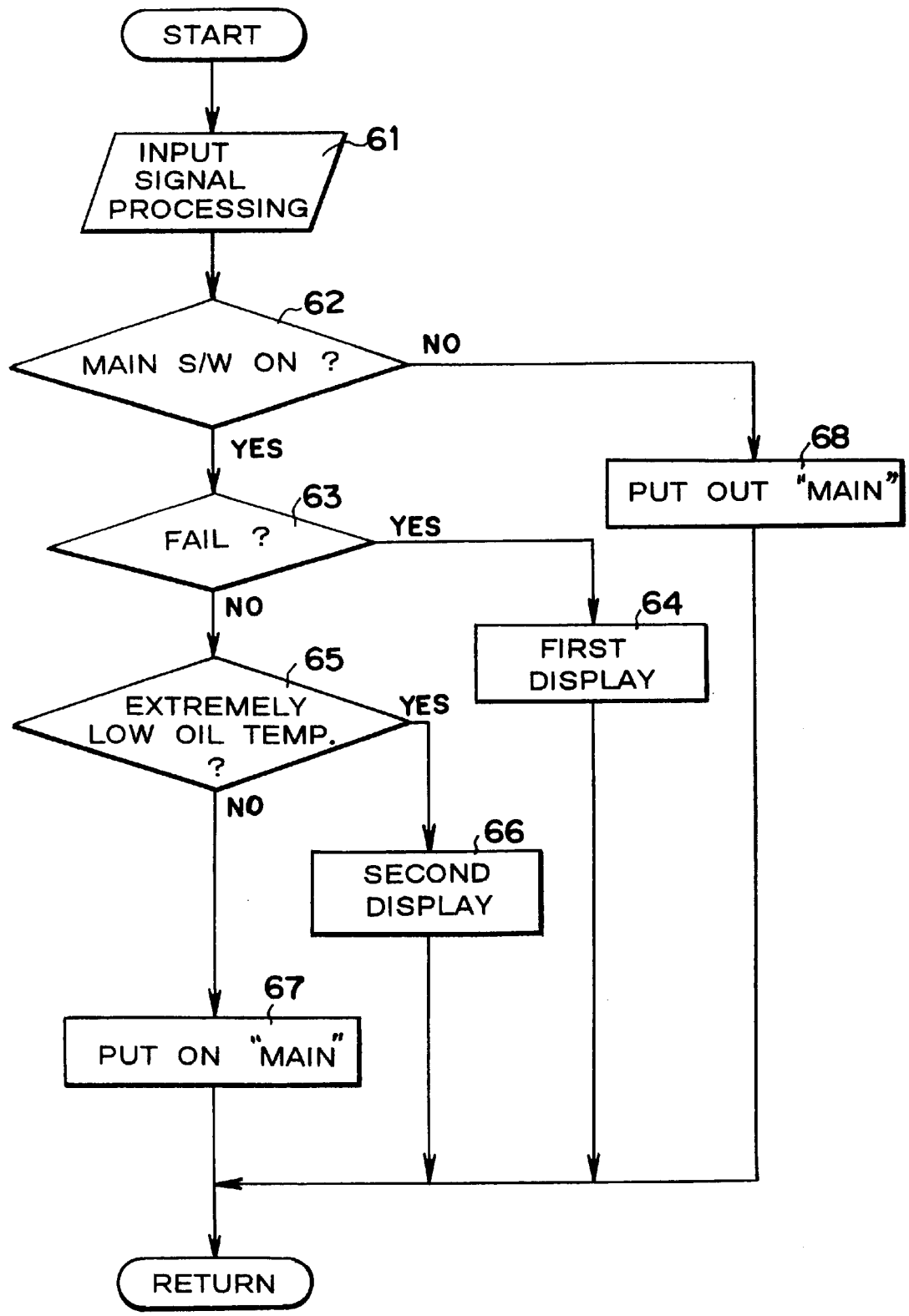
FIG. 14 is a flow chart showing one embodiment of a control routine for controlling the display when a shift range is electrically switched.

As known from the foregoing embodiments, the switching of the shift range by the electric operation has two modes in which the switching is inhibited because of a fail in the system and in which the switching is inhibited because the state of the vehicle is unfit for it. It is, therefore, desired that, when the electric switching of the shift range is not executed although operated, the reason for the inexecution is displayed. For this desire, the system according to the present invention executes the controls, as shown in FIG. 14.

After the input signal processing (at Step 61), it is decided (at Step 62) whether or not the main switch 64 has been turned ON. When the main switch 64 is turned ON to affirm the answer of Step 62, it is decided (at Step 63) whether or not the system for switching the shift range electrically has failed. This fail decision can be made either by detecting that the cut switch 63 is generating its output signal at all times or that the solenoid valve SOL4 for setting the engine braking range cannot be powered, or on the basis of the fact that a predetermined oil pressure is not produced. When the answer of Step 63 is YES, a first display (of Step 64) is executed to indicate that the fail disables the shift range to be switched. One example of this first display is to put out the "MAIN" in the enabling display unit 70, as shown in FIG. 1. Specifically, the fail can be known because the display of "MAIN" does not appear in the enabling display unit 70 although the main switch 64 is turned ON.

Figure 15A:
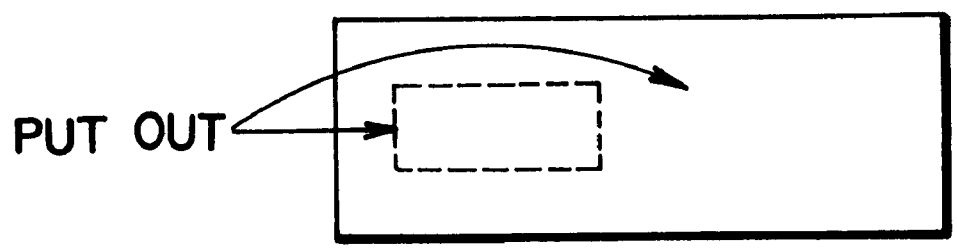
FIG. 15A is a schematic diagram showing one example of the display when a shift range cannot be electrically switched.
Figure 15B:
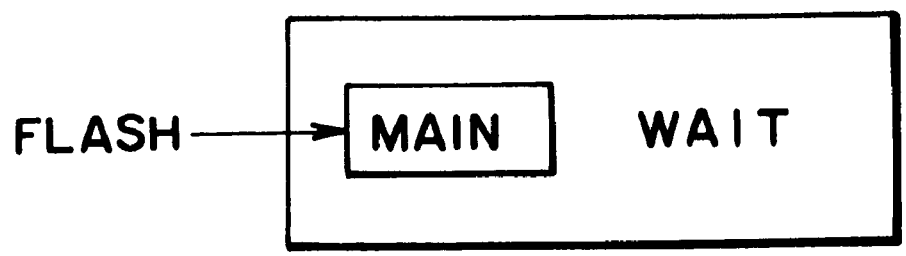
FIG. 15B is a schematic diagram showing another example of the display when a shift range cannot be electrically switched.

When no fail occurs to deny the answer of Step 63, on the other hand, it is decided (at Step 65) whether or not the oil temperature is extremely low. When the oil temperature is extremely low, i.e., lower than a set level, the high viscosity lowers the response characteristics of the oil pressure and accordingly degrades the response of the oil pressure control by the solenoid valve. Therefore, the switching of the shift range by the electric operation is not desirable, and the switching of the shift range by the cut switch 63 or the cut-off switch 62 may be rejected. Therefore, when the answer of Step 65 is YES, a second display is executed (at Step 66). Specifically, the display of "MAIN" in the enabling display unit 70 of FIG. 1 is flashed, and a display for an auxiliary guide such as "WAIT" is executed in the electric range display unit 71. An example of the first display of Step 64 is illustrated in FIG. 15A, and an example of the second display of Step 66 is illustrated in FIG. 15B.

When the oil temperature is not extremely low so that the answer of Step 65 is NO, on the other hand, the "MAIN" is put on in the enabling display unit 70 (at Step 67). In other words, it is displayed the shift range can be switched by the electric operation. When the main switch 64 is turned OFF to deny the answer of Step 62, on the other hand, the display of "MAIN" in the enabling display unit 70 is put out (at Step 68) to display that the shift range cannot be switched by the electric operation. Here, the operation of Step 64 in FIG. 14 corresponds to fail display means of the present invention, and the operation of Step 66 corresponds to switching interrupt display means of the present invention.

With the construction shown in FIG. 1, therefore, when the shift range cannot be switched by the switching operation, it is possible to know easily and reliably whether the cause comes from the fail or the temporary state of the vehicle. Here, the cause for disabling the shift range to be temporarily switched by the electric operation is exemplified by the low oil temperature in the embodiment of FIG. 14 but can be additionally enumerated by the over-revolution of the engine or by the inhibition by the VSC or by the navigation system.

Although the present invention has been described in connection with its specific embodiments, it can be practiced for an automatic transmission which is equipped with a gear train or a hydraulic circuit other than the gear train shown in FIG. 17 or the hydraulic circuit shown in FIG. 19.

Here will be synthetically described the advantages to be achieved by the present invention. According to the present invention thus far described, the shift range set by the first range switching mechanism for switching the shift range mechanically, the state, in which the second range switching mechanism for switching the shift range electrically is active, and the shift range set by the second range switching mechanism are displayed by the first to third display means, respectively. In view of these displays, therefore, the driver can easily know the set state of the shift range in the automatic transmission so that the conveniences of those range switching mechanisms can be accordingly improved.

According to the present invention, moreover, when the switching of the shift range by the electric operation cannot be executed, the first display means or the second display means performs its display, as based on the cause, so that the driver can grasp easily and reliably the set situation of the shift range of the automatic transmission.

According to the present invention, when the control to switch the range to the engine braking range by the electric operation cannot be executed, the driver is urged to make the control to set the engine braking range by the mechanical operation. As a result, the engine braking can be set, when a braking force is demanded, not by the electric operation but by the mechanical operation thereby to achieve the demanded braking force so that the frequency of using the brake such as a foot brake can be lowered.

According to the present invention, when the engine braking is set by the second range switching mechanism for switching the shift range by the electric operation, the fail of the second range switching mechanism having detected the deceleration in the running state is decided so that the fail, as including the electric fail, of the entirety of the shift range switching mechanism can be detected without fail.

According to the present invention, it is known from the emphasized display of the prevailing shift range that the switching of the shift range by the electric operation cannot be temporarily made. As a result, it is possible to know the shift range to be set by the automatic transmission and to make preparations for the subsequent operation.

According to the present invention, moreover, when the shift range is set by the electric means such as the switch, the setting state of the shift range is displayed on the windshield by the head-up display so that the setting situation of the shift range can be easily known without missing the sight of the front thereby to further improve the conveniences of the system for setting the shift range by the electric means.

According to the present invention, still moreover, when the momentary switch acting as the enabling means is operated, it can be confirmed by the display means whether or not the operation is effectively accepted by the control means, thereby to improve the operability.

What is claimed is:

1. A display system for an automatic transmission which has a first range switching mechanism for switching a shift range by mechanical means and a second range switching mechanism activated by electric enabling means for switching the shift range by electric means, comprising:

first display means for displaying the shift range which is selected by said first range switching mechanism;

second display means for displaying the acting state of said enabling means; and third display means, which is different from said first display means, for displaying the shift range which is selected by the second range switching mechanism activated by said enabling means, wherein said first display means and said third display means simultaneously respectively display the shift range which is selected by said first range switching mechanism and the shift range which is selected by the second range switching mechanism, which shift ranges displayed by said first and third display means may be different from one another.

2. A display system for an automatic transmission which has a first range switching mechanism for switching a shift range by mechanical means and a second range switching mechanism activated by electric enabling means for switching the shift range by electric means, comprising:

first display means for displaying the shift range which is selected by said first range switching mechanism;

second display means for displaying the acting state of said enabling means; and third display means for displaying the shift range which is selected by the second range switching mechanism activated by said enabling means, wherein said enabling means includes means for activating said second range switching mechanism when a predetermined shift range is set by said first range switching mechanism, and wherein said third display means includes means for displaying the shift range which is set by operating said second range switching mechanism.

3. A display system according to claim 2, wherein said third display means includes means for canceling the display of said predetermined shift range normally.

4. A display system for an automatic transmission enabled to switch a shift range by electric means, comprising:

fail display means for displaying that the switching of the shift range by said electric means is disabled by a failure; and switching interrupt display means for displaying that the switching of the shift range by said electric means is temporarily unable to be switched on the basis of a running state and for displays an operation to cope with the temporary inability to switch the shift range.

5. A display system according to claim 4, wherein said fail display means and said switching interrupt display means include: a single display member shared in between; and means for displaying different modes in said display member.

6. A display system for an automatic transmission which has a first range switching mechanism for switching a shift range by mechanical means and a second range switching mechanism for switching the shift range by electric means, comprising:

electric switching inhibition detecting means for detecting that the switching to an engine braking range by said second range switching mechanism is unable; and manual switching display means for making a display to urge the switching to the engine braking range by said first range switching mechanism, when it is detected by said electric switching inhibition detecting means that the switching to the engine braking range by said second range switching mechanism is unable.

7. A display system according to claim 6, wherein said electric switching inhibition detecting means includes means for detecting that the switching to the engine braking range by said second range switching mechanism is unable on the basis of a comparison of an RPM of a predetermined rotary member.

8. A display system according to claim 6, wherein said electric switching inhibition detecting means includes means for detecting that the switching to the engine braking range by said second range switching mechanism is unable on the basis of a deceleration of a vehicle having said automatic transmission mounted thereon.

9. A display system according to claim 6, wherein said first range switching mechanism includes means capable of executing the switching to the engine braking range even when an electric fail occurs.

10. A display system for an automatic transmission which has a first range switching mechanism for switching a shift range by mechanical means and a second range switching mechanism for switching the shift range by electric means, comprising:

electric shift detecting means for detecting that an engine braking range is selected by said second range switching mechanism;

deceleration detecting means for detecting a deceleration when the switching to the engine braking range is detected by said electric shift detecting means;

electric switching inhibited state detecting means for detecting a fail of the switching to the engine braking range by said second range switching mechanism on the basis of the deceleration which is detected by said deceleration detecting means; and display means for displaying the detected result of said electric switching inhibited state detecting means.

11. A display system for an automatic transmission capable of switching a shift range by electric means, comprising:

display means for displaying a shift range; and means for causing the display means to emphasize the display of the shift range which is set when the switching to the engine braking range by said electric means is rejected.

12. A display system according to claim 11, wherein said emphasized display means includes means for displaying the shift range which is set by a mechanical operation at the instant when the electric switching to the shift range from a shift range by a mechanical operation is unable.

13. A display system according to claim 11, wherein said emphasized display means includes means for performing a flashing display controlled in the duration and the frequency.

14. A display system according to claim 11, further comprising:

means for performing a voice notification when said emphasized display means performs the emphasized display.

15. A display system for an automatic transmission capable of switching a shift range by electric means, comprising:

a head-up display for displaying on a windshield of a vehicle at least one of the shift range set by said electric means and a gear stage set by said shift range.

16. A display system according to claim 15, further comprising:

means for turning ON said head-up display forcibly when the shift range is electrically switched, wherein said head-up display includes means for displaying either the shift range electrically set or the gear stage.

17. A display system according to claim 15, wherein said head-up display includes means for displaying the information on the electrically set shift range in place of the preceding display when the shift range is switched by the electric operation.

18. A display system according to claim 15, wherein said automatic transmission includes gear change means for performing a gear change by a manual operation, and wherein said head-up display includes means for displaying the information on the gear change which is executed by the manual operation.

19. A display system for an automatic transmission which has a range switching mechanism activated by electric enabling means for switching a shift range by electric means, comprising:

a momentary switch for outputting, when turned ON, a signal for activating said range switching mechanism;

control means for processing to enable/disable said range switching mechanism on the basis of said signal; and display means for displaying the processed result by said control means.

20. A display system according to claim 19, wherein said momentary switch is mounted on the steering wheel of a vehicle having said automatic transmission mounted thereon.

21. A display system according to claim 19, wherein said control means includes means for holding the enabled/disabled state at the instant when said enabling means fails.

22. A display system according to claim 19, wherein said control means includes means for performing the disabling processing by deciding it a fail that said enabling means is outputting its signal continuously for a predetermined or longer time period.

23. A display system according to claim 19, wherein said control means includes means for restoring the disabled state by interrupting a power supply.

24. A display system according to claim 19, wherein said control means includes means for holding the enabled state even when the shift range is mechanically switched.

25. A display system according to claim 19, wherein said control means includes means for executing no enabling processing when said enabling means outputs its signal simultaneously as a power supply is turned ON.

* * * * *